(12) United States Patent
Gazit et al.

(10) Patent No.: US 11,831,233 B2
(45) Date of Patent: *Nov. 28, 2023

(54) MULTILEVEL CONVERTER CIRCUIT AND METHOD WITH DISCRETE VOLTAGE LEVELS

(71) Applicant: Solaredge Technologies Ltd., Herzeliya (IL)

(72) Inventors: Meir Gazit, Ashkelon (IL); Menashe Walsh, Modi'in Illit (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/222,454

(22) Filed: Apr. 5, 2021

(65) Prior Publication Data

US 2021/0281191 A1 Sep. 9, 2021

Related U.S. Application Data

(63) Continuation of application No. 16/660,105, filed on Oct. 22, 2019, now Pat. No. 10,972,016.

(Continued)

(51) Int. Cl.
*H02M 1/10* (2006.01)
*H02M 7/483* (2007.01)
(Continued)

(52) U.S. Cl.
CPC ............ *H02M 1/10* (2013.01); *H02M 7/483* (2013.01); *H02M 7/49* (2013.01); *H02M 7/537* (2013.01);

(Continued)

(58) Field of Classification Search
CPC ........ H02M 1/00; H02M 7/49; H02M 7/5395; H02M 7/64; H02M 1/0009; H02M 1/007; H02M 1/0048; H02M 1/0054; H02M 1/0058; H02M 7/4833; H02M 1/10; H02M 1/0067; Y02B 70/10; H02J 3/38
See application file for complete search history.

(56) References Cited

U.S. PATENT DOCUMENTS 6,005,788 A * 12/1999 Lipo ............... B60L 15/007
363/71
9,065,299 B2 * 6/2015 Trainer .............. G05F 1/70
(Continued)

FOREIGN PATENT DOCUMENTS

WO 2015123267 A1 8/2015
WO 2016037666 A1 3/2016

OTHER PUBLICATIONS

Apr. 7, 2020—Extended European Search Report—19204832.0.
Sep. 29, 2023—CN Office Action—CN App. No. 201911017618.8.

*Primary Examiner* — Yusef A Ahmed
(74) *Attorney, Agent, or Firm* — Banner & Witcoff, Ltd.

(57) ABSTRACT

A power conversion system includes a first converter configured to convert an input voltage into discrete voltage levels, and provide each discrete voltage level at a corresponding output terminal. The power conversion system further includes a second converter configured to convert the discrete voltages into modulated voltages. The power conversion system further includes a selection unit configured to alternatively output each of the modulated voltage voltages across a pair of output terminals.

16 Claims, 14 Drawing Sheets

Related U.S. Application Data

(60) Provisional application No. 62/749,708, filed on Oct. 24, 2018.

(51) Int. Cl.
*H02M 7/5395* (2006.01)
*H02M 7/64* (2006.01)
*H02M 7/49* (2007.01)
*H02M 7/537* (2006.01)
*H02M 1/00* (2006.01)

(52) U.S. Cl.
CPC ........... *H02M 7/5395* (2013.01); *H02M 7/64* (2013.01); *H02M 1/007* (2021.05); *H02M 1/0009* (2021.05); *H02M 1/0054* (2021.05); *H02M 7/4833* (2021.05)

(56) References Cited

U.S. PATENT DOCUMENTS

| | | | | |
|---|---|---|---|---|
| 9,450,506 B2* | 9/2016 | Perreault | | H02M 7/217 |
| 9,882,471 B2* | 1/2018 | Giuliano | | H02M 3/158 |
| 9,906,183 B1* | 2/2018 | Agirman | | H02M 5/4585 |
| 10,003,251 B2* | 6/2018 | Wu | | H02M 1/15 |
| 10,003,279 B2* | 6/2018 | Qu | | H02M 7/4837 |
| 10,116,229 B1* | 10/2018 | Alshammaa | | H02J 3/381 |
| 10,177,683 B2* | 1/2019 | Shi | | H02M 7/483 |
| 10,389,235 B2* | 8/2019 | Giuliano | | H02M 3/1582 |
| 10,978,957 B2* | 4/2021 | Zhang | | H02M 3/33523 |
| 11,056,983 B1* | 7/2021 | Wu | | H02M 1/12 |
| 2004/0125523 A1* | 7/2004 | Edwards | | H02M 7/487 |
| | | | | 361/88 |
| 2004/0267468 A1* | 12/2004 | Leuthen | | H02M 7/483 |
| | | | | 702/64 |
| 2006/0062034 A1* | 3/2006 | Mazumder | | H02M 7/4837 |
| | | | | 363/131 |
| 2006/0152205 A1* | 7/2006 | Tang | | H02M 3/1584 |
| | | | | 323/284 |
| 2010/0328977 A1* | 12/2010 | Asplund | | H02M 7/483 |
| | | | | 700/298 |
| 2011/0080762 A1 | 4/2011 | Nikolov | | |
| 2012/0044731 A1* | 2/2012 | Wirth | | H02M 7/493 |
| | | | | 363/132 |
| 2012/0057378 A1 | 3/2012 | Fratta | | |
| 2012/0092908 A1 | 4/2012 | Piotr et al. | | |
| 2012/0256568 A1* | 10/2012 | Lee | | B60L 7/26 |
| | | | | 429/150 |
| 2013/0014384 A1* | 1/2013 | Xue | | H02M 1/0095 |
| | | | | 29/825 |
| 2013/0088906 A1* | 4/2013 | Jiang-Hafner | | H02M 7/4835 |
| | | | | 363/131 |
| 2013/0343089 A1* | 12/2013 | Gupta | | H02M 7/49 |
| | | | | 363/16 |
| 2014/0063884 A1* | 3/2014 | Itoh | | H02M 7/483 |
| | | | | 363/132 |
| 2014/0063885 A1* | 3/2014 | Itoh | | H02M 7/4837 |
| | | | | 363/132 |
| 2014/0169040 A1* | 6/2014 | Schroeder | | H02M 3/335 |
| | | | | 363/21.01 |
| 2014/0268967 A1* | 9/2014 | White | | H02M 7/487 |
| | | | | 363/133 |
| 2015/0016169 A1* | 1/2015 | Honea | | H02M 7/483 |
| | | | | 363/132 |
| 2015/0049524 A1* | 2/2015 | Wagoner | | H02M 7/483 |
| | | | | 363/37 |
| 2015/0084701 A1* | 3/2015 | Perreault | | H02M 3/158 |
| | | | | 330/297 |
| 2015/0155895 A1* | 6/2015 | Perreault | | H02M 3/07 |
| | | | | 330/297 |
| 2015/0194902 A1* | 7/2015 | Tian | | H02M 7/4837 |
| | | | | 363/37 |
| 2015/0288284 A1* | 10/2015 | Lavieville | | H02M 3/158 |
| | | | | 363/34 |
| 2015/0333658 A1* | 11/2015 | Lavieville | | H02M 7/483 |
| | | | | 318/400.26 |
| 2015/0381074 A1* | 12/2015 | Flett | | H02M 3/156 |
| | | | | 320/101 |
| 2016/0094214 A1* | 3/2016 | Liu | | H03K 17/005 |
| | | | | 327/113 |
| 2016/0118909 A1 | 4/2016 | Cheng et al. | | |
| 2016/0336872 A1* | 11/2016 | Cheng | | H02M 7/487 |
| 2017/0099013 A1* | 4/2017 | Martini | | H02M 7/487 |
| 2017/0250620 A1* | 8/2017 | White | | H02M 1/4258 |
| 2017/0331374 A1* | 11/2017 | Høyerby | | H03F 3/183 |
| 2017/0338735 A1* | 11/2017 | Alarcon-Cot | | H02M 1/4225 |
| 2017/0359037 A1* | 12/2017 | Høyerby | | H03F 3/2178 |
| 2018/0043789 A1* | 2/2018 | Goetz | | B60L 58/22 |
| 2018/0091037 A1* | 3/2018 | Zhao | | H02M 7/5387 |
| 2018/0219492 A1 | 8/2018 | Shi et al. | | |
| 2018/0226879 A1* | 8/2018 | Wang | | H02M 7/4835 |
| 2018/0269782 A1* | 9/2018 | Mondal | | H02M 1/083 |
| 2018/0301905 A1* | 10/2018 | Dai | | H02J 1/102 |
| 2019/0058416 A1* | 2/2019 | Wang | | H02M 7/48 |
| 2019/0190376 A1* | 6/2019 | Xiong | | H02M 3/07 |
| 2019/0267889 A1* | 8/2019 | McBryde | | H02M 1/088 |
| 2019/0280586 A1* | 9/2019 | Chen | | H02M 1/4208 |
| 2019/0363644 A1* | 11/2019 | Li | | H02M 7/4837 |
| 2020/0067423 A1* | 2/2020 | Maksimovic | | H02M 3/33584 |
| 2020/0350833 A1* | 11/2020 | Corzine | | H02M 7/487 |
| 2020/0412239 A1* | 12/2020 | Grbovic | | H02J 3/381 |
| 2021/0067057 A1* | 3/2021 | Abarzadeh | | H02M 7/4837 |
| 2021/0313936 A1* | 10/2021 | Garrett | | H03F 3/211 |
| 2022/0029529 A1* | 1/2022 | Chen | | H02M 7/797 |
| 2022/0200492 A1* | 6/2022 | Kuder | | H02M 7/5395 |

* cited by examiner

MULTILEVEL CONVERTER CIRCUIT AND METHOD WITH DISCRETE VOLTAGE LEVELS

CROSS REFERENCE TO RELATED APPLICATIONS

The present application is a continuation of and claims priority to U.S. non-provisional patent application Ser. No. 16/660,105, filed Oct. 22, 2019, entitled "Multilevel Converter Circuit and Method," which claims priority to U.S. provisional Patent Application No. 62/749,708, filed Oct. 24, 2019, entitled "Multilevel Converter Circuit and Method," the entire contents of which are incorporated herein by reference for all purposes.

BACKGROUND

Converters may be used for converting direct current (DC) voltage into another DC voltage and/or to an alternating current (AC) voltage. Converter construction may typically make use of power transistors and diodes. The power transistors and diodes may be operated as electronic switches. Certain converter designs may use "hard" switching, which may give rise to switching losses which, for high values of the switching frequency, may cause a reduction in energy conversion efficiency. Hard switching may be characterized by a total commutation voltage drop over the current-carrying switch at a current commutation time. In case of hard switching, the voltage may increase up to the value of the commutation voltage while the current continues flowing, before it drops, which may cause high power loss peaks in the switch. It may therefore be desirable to develop converter topologies and switching methods that enable "soft" switching, which may reduce total switching losses.

In attempts to improve converter efficiency and reduce costs, high-power converters may make use of a technique referred to as multi-level inversion. Multi-level converter design may reduce the occurrence of simultaneously high values of voltage and current, and hence high-power dissipation values, during the switching process. Additionally, multi-level converter topologies may provide multiple output voltage values, which may reduce the size of associated output filters. It may be desirable to develop converter topologies and efficient switching methodologies to improve the cost and/or efficiency of converters.

SUMMARY

The following summary briefly describes certain features and is not intended to be an extensive overview and is not intended to identify key or critical elements.

Systems, apparatuses, and methods are described for a multi-level converter configurable to convert a direct current (DC) voltage its input to an alternating current (AC) at its output. A first converter may be adapted to convert an input voltage to give multiple first discrete output voltages on respective first output terminals of the first converter. A second converter may be adapted to convert at least one of the first discrete output voltages to two discrete states of voltage. The two discrete states of voltage may be provided on multiple second output terminals of the second converter for each of the first discrete output voltages. A selection unit may be adapted to provide an output voltage on output terminals selected from the second output terminals responsive to sensed electrical parameters of the multi-level converter and/or a reference signal.

These and other features and advantages are described in greater detail in the Detailed Description below.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures.

DETAILED DESCRIPTION

In the following description of various illustrative embodiments, reference is made to the accompanying drawings, which form a part hereof, and in which is shown, by way of illustration, various embodiments in which aspects of the disclosure may be practiced.

By way of introduction, features may be directed in general to a converter topology that converts a direct current (DC) voltage at its input to an alternating current (AC) voltage at its output. The DC voltage at the input may be a single DC voltage that, for example, may be provided from various interconnections of DC power sources. The single DC voltage in a first conversion may be separated by the first conversion to give multiple DC outputs that then in a second conversion may provide multiple AC outputs. The AC outputs may then be selected and controlled responsive to a reference signal and/or electrical parameters sensed in the converter topology. The selection control may ensure correct levels of operating voltage, current, impedance, resistance, phase angle, power factor, level of harmonic distortion, frequency and/or power for example.

The term pulse width modulation (PWM) as used herein is with respect to the operation of switches described below. Unless otherwise stated, the term "PWM" refers to an active use of a switch for a period of time. The active use of the switch during the period of time may include the switch being substantially open and closed circuit repeatedly during the time period. The term 'ON' as used herein with respect to the operation of switches described below, refers to the active use of a switch during the time period. During the time period, the switch remains substantially closed circuit for the time period. The term "'OFF'" as used herein is with respect to the operation of switches described below and refers to active use of a switch during the time period. During the time period, the switch remains substantially open circuit for the time period.

The term "multiple" as used here in the detailed description indicates the property of having or involving two or more parts, elements, or members. The claim term "a plurality of" as used herein in the claims section finds support in the description with use of the term "multiple" and/or other plural forms. Other plural forms may include for example regular nouns that form their plurals by adding either the letter 's' or 'es' so that the plural of converter is converters or the plural of switch is switches for example.

Figure 1A:
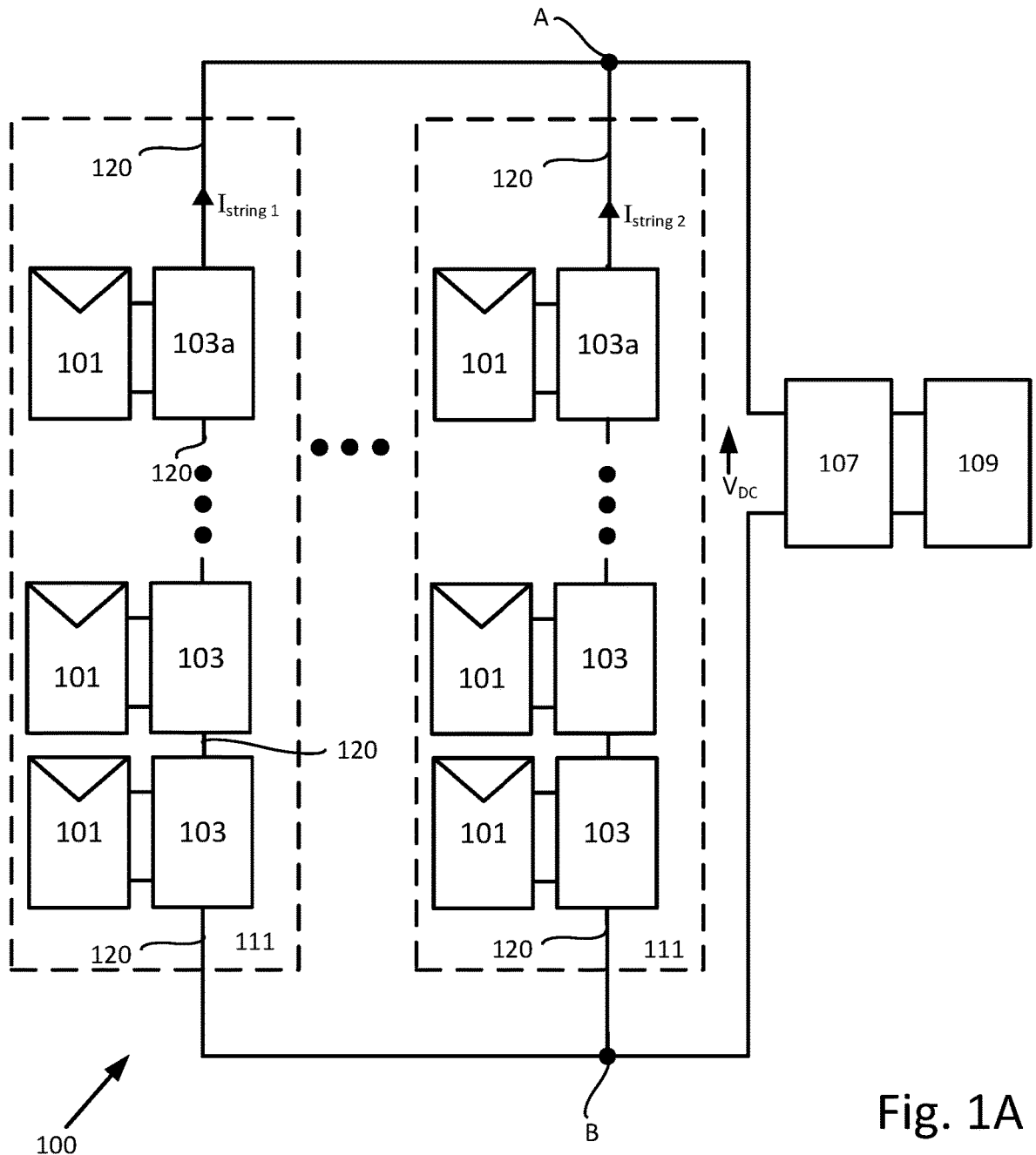
FIG. 1A shows a block diagram of power system, according to illustrative aspects of the disclosure.

Reference is now made to FIG. 1A, which illustrates a block diagram of a power system 100, according to illustrative aspects of the disclosure. Power system 100 may include multiple wiring configurations 111. Each wiring configuration 111 may include one or more power sources 101 that may be connected to a respective power device 103. Power sources 101 may be AC power sources (e.g., wind turbines) or sources of DC power derived from wind turbines, battery banks, photovoltaic solar panels, rectified alternating current (AC) or electrical power derived from petrol generators, for example. Each wiring configuration 111 may include output terminals A and B. The outputs on terminals A and B of the wiring configurations 111 may be connected in series to form a series connection of wiring configuration 111 outputs that may be connected to input terminals of a converter 107. Each wiring configuration 111 may include output terminals A and B. The outputs on terminals A and B of the other wiring configurations 111 may be connected in parallel to form a parallel connection of wiring configuration 111 outputs. The parallel connection may be connected to input terminals of converter 107 with a voltage $V_{DC}$. The output terminals converter 107 may be connected to load 109 and/or multiple loads 109. According to illustrative aspects of the disclosure described below, converter 107 may be a DC to AC converter, and load 109 may be an AC utility grid, for example.

Figure 1B:
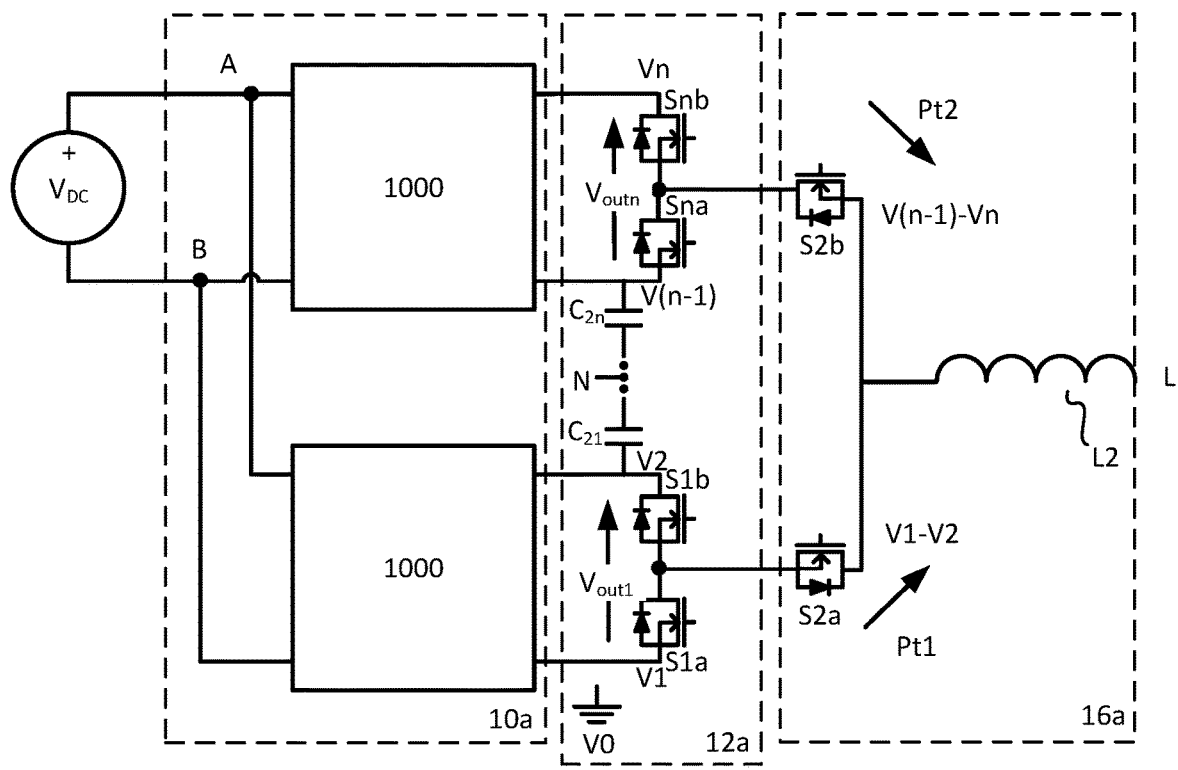
FIGS. 1B, 1C, 1D, 1E illustrate diagrams of converters, according to illustrative aspects of the disclosure.

Reference is now made to FIG. 1B, which illustrates a block diagram of further details of converter 107a, according to illustrative aspects of the disclosure. Converter 107a may include single input multiple level output (SIMLO) converter 10a, multiple input multiple output (MIMO) converter 12a and selector unit 16a. Converter 107a may be considered as an example of a substantially symmetric converter topology. Connected to the input of SIMLO converter 10a at terminals A and B is direct current (DC) voltage $V_{DC}$. Voltage $V_{DC}$ may be supplied from the DC output of power system 100. The voltage $V_{DC}$ may be another source of DC supply such as DC from a battery, DC generator, a photovoltaic panel or any other source of DC power that may be provided on terminals A and B. Included in SIMLO converter 10a may be two DC to DC converters 1000 with two inputs connected in parallel to each other at terminals A and B.

Converters 1000 may have a series connection of switches S1a/S1b and Sna/Snb connected respectively across the two outputs of converters 1000. Switches S1a/S1b and Sna/Snb may be included in MIMO converter 12a. A series connection of capacitors $C_{21}$-$C_{2n}$ may connect between the two outputs of converters 1000. At substantially in the middle of the series connection of capacitors $C_{21}$-$C_{2n}$ may be provided the neutral (N) connection point for converter 107a. Two outputs of MIMO converter 12a may be provided at the respective points where switch S1a connects to switch S1b and switch Sna connects to switch Snb. The two outputs of MIMO converter 12a connect to the two inputs of selector unit 16a respectively to one side of each of switches S2a and S2b. The other side of switches S2a and S2b connect together and to one side of inductor L2. The other side of L2 and the middle of the series connection of capacitors $C_{21}$-$C_{2n}$ may provide respectively the live (L) and neutral (N) alternating current (AC) output of converter 107a. Converters 1000 located and connected on either side of the middle of the series connection of capacitors $C_{21}$-$C_{2n}$. The other side of switches S2a and S2b connecting together to one side of inductor L2 provides the substantially symmetric topology of converter 107a.

In operation, SIMLO converter 10a may be configurable to convert voltage $V_{DC}$ to two discrete voltage levels of DC output voltage respectively as V1 or V2 and Vn−1 or Vn. DC output voltage V1 or V2 and Vn−1 or Vn may be provided on each of the two output terminals of SIMLO converter 10a with respect to negative terminal V0. SIMLO converter may comprise switching circuitry as shown in FIG. 1B and other figures. The two discrete voltage levels of DC output voltage on each the two output terminals of SIMLO converter 10a may provide two respective selectable current paths Pt1 and Pt2. Paths Pt1 and Pt2 may be provided by selector unit 16a so as to provide the live (L) and neutral (N) alternating current (AC) output of converter 107a.

Figure 1C:
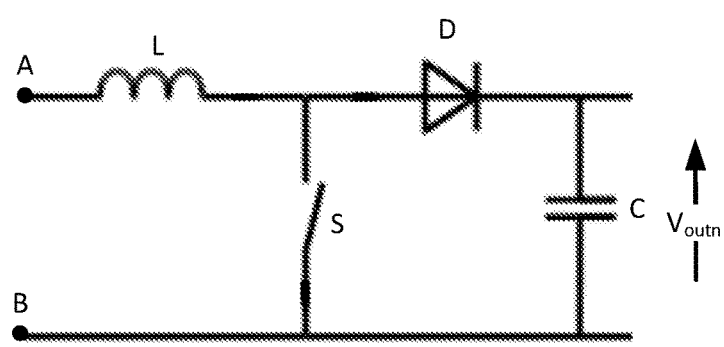

Reference is now made to FIG. 1C, which illustrates a block diagram of further details of converter 1000, according to illustrative aspects of the disclosure. Converter 1000 is shown as a DC to DC boost converter with input at terminals A and B. One side of inductor L connects to terminal A. The other side of inductor L connects to the anode of diode D and on side of switch S. The cathode of diode D connects to one side of capacitor C. The other sides of capacitor C and switch S connect to terminal B. The output of converter 1000 is provided across capacitor C as output voltage $V_{outn}$. In the case of converter 1000 being a DC to DC boost converter output voltage $V_{outn}$ may be greater than the input voltage $V_{DC}$ applied to the input of converter 1000. Alternatively, or in addition, converter 1000 may be implemented as another DC to DC converter to give a buck, buck/boost and/or buck+boost operation on voltage $V_{DC}$.

Figure 1D:
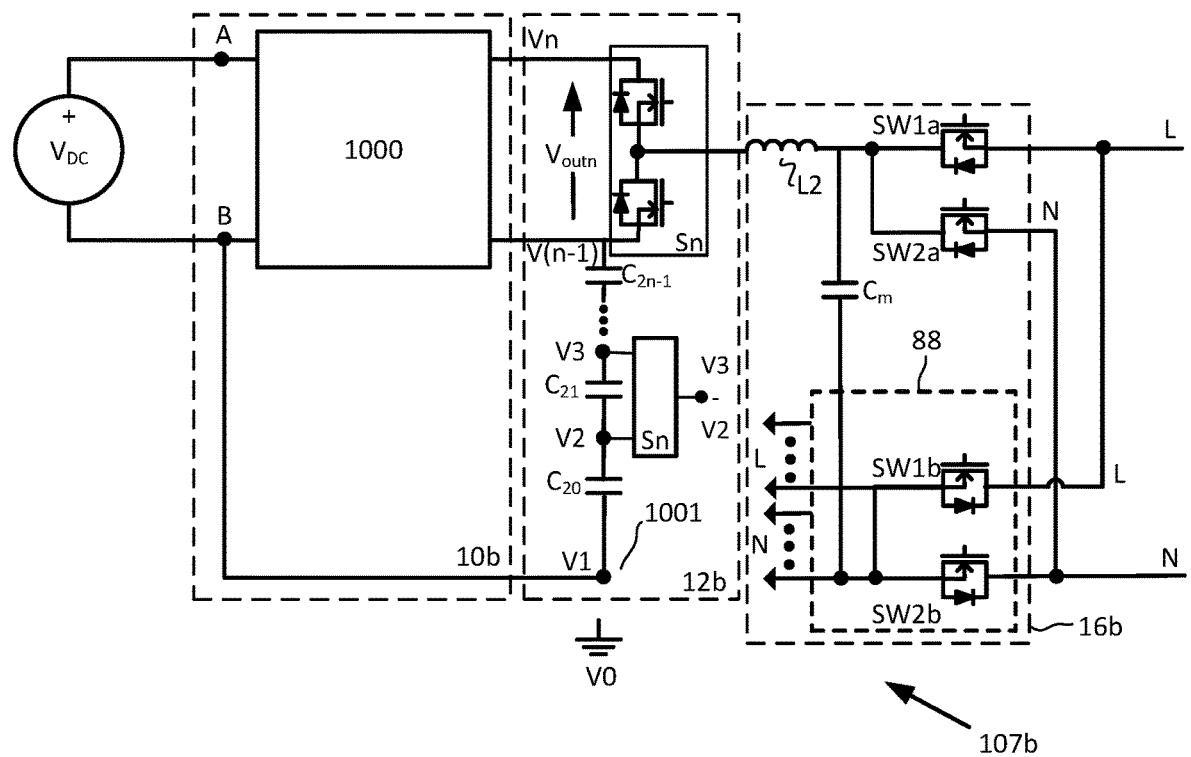

Reference is now made to FIG. 1D, which illustrates a block diagram of converter 107b, according to illustrative aspects of the disclosure. Converter 107b may include single input multiple level output (SIMLO) converter 10b, multiple input multiple output (MIMO) converter 12b and selector unit 16b. Converter 107b may be considered as an example of a substantially asymmetric converter topology. Connected to the input of SIMLO converter 10b at terminals A and B is direct current (DC) voltage $V_{DC}$. Included in SIMLO converter 10b may be DC to DC converter 1000 providing voltage $V_{outn}$ at its output. Converter 1000 may have a series connection of switches in a switch network Sn connected respectively across the output of converter 1000. Switch network Sn may be included in MIMO converter 12b. Further included in MIMO converter 12b is a series string of capacitors $C_{20}$-$C_{2n-1}$ connected between the lower switch of switch network Sn and terminal B. A possibility of connecting other switch networks Sn across other capacitors is shown with respect to capacitor $C_{21}$.

An output of converter 12b is provided at the point where the two series switches of switch network Sn. The output provided by switch network Sn may connect to an input of selector unit 16b to one side of inductor L2 that may be included in selector unit 16b. The other side of inductor L2 connects to one side of capacitor $C_m$ and to one side of switches SW1a and SW2a, which are connected together. The other side of capacitor $C_m$ connects to the neutral (N) connection point inside multiplexor (MUX) 88. The other sides of switches SW1a and SW2a provide respectively the live (L) and neutral (N) outputs of converter 107b. The live (L) and neutral (N) outputs of converter 107b connect respectively to switches SW1b and SW2b that may be included in MUX 88. The other side of switches SW1b and SW2b connect together and provide the multiple live (L) and neutral (N) inputs to MUX 88. The multiple inputs may be provided by an interconnection of multiple switches (not shown). The interconnection may allow the live (L) or neutral (N) inputs of MUX 88 to be selectively connected to terminals V1, V2, V2-V3, V3 and V(n−1) via respective switches SW1b and SW2b.

Figure 1E:
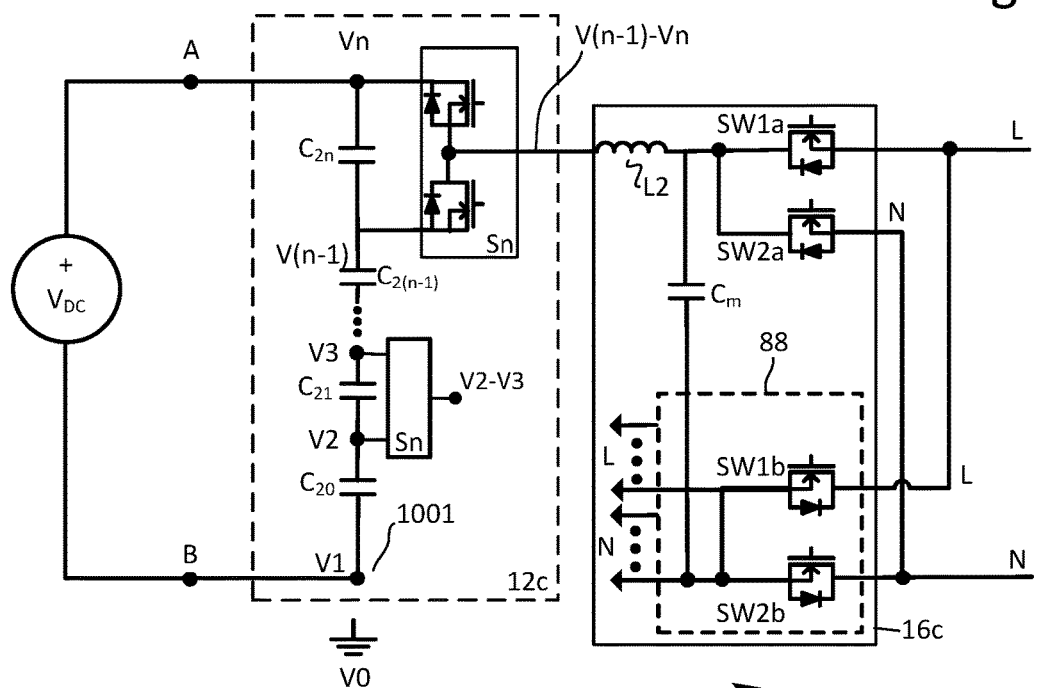

Reference is now made to FIG. 1E, which illustrates a block diagram of converter 107c, according to illustrative aspects of the disclosure. Converter 107c may include multiple input multiple output (MIMO) converter 12c and selector unit 16c. Converter 107c is the same as converter 107b except that converter 107c does not include SIMLO converter 10b. Instead, with converter 107c, voltage $V_{DC}$ provided at terminals A and B may be connected across the input of MIMO converter 12c at terminals Vn and V1. One converter 1000 (not shown in FIG. 1E) may be located and connected to one side above the middle of the series connection of capacitors $C_{21}$-$C_{2n}$. The difference between connections/operating frequencies PWM of switch network Sn and multiplexor 88 may provide the substantially asymmetric topology of converters 107d and 107e.

Figure 1F:
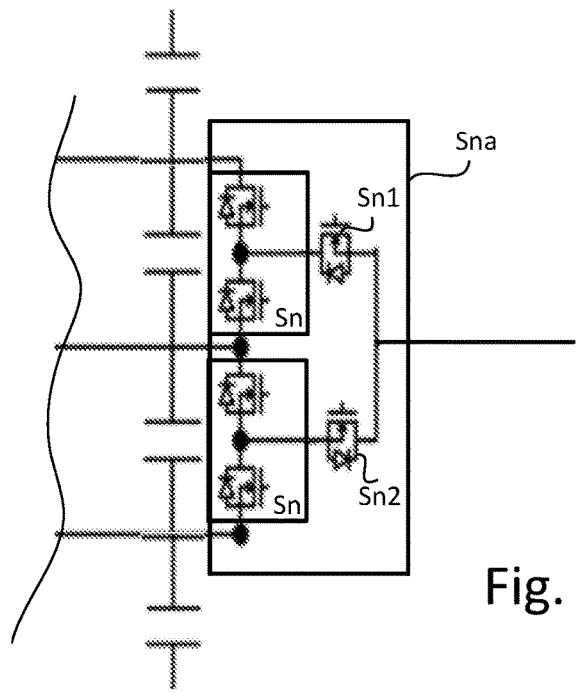
FIG. 1F illustrates a partial view of a switch network that may be included in a converter, according to illustrative aspects of the disclosure.

Reference is now made to FIG. 1F, which illustrates a partial view of a switch network Sna that may be included in a MIMO converter 12, according to illustrative aspects of the disclosure. As with FIGS. 1D and 1E, the partial view shows two series connected switches connected across a capacitor that may be included in switch network Sn. The capacitor may be the output and/or the output capacitor C of converter 1000 or a capacitor of series string of capacitors $C_{20}$-$C_{2n-1}$. Another switch network Sn may be connected across another capacitor that may be next to the capacitor. Another switch network Sn may be separated a number of capacitors away from the capacitor in the series string of capacitors ($C_{20}$-$C_{2n-1}$ for example). A further two switches Sn1 and Sn2 may be wired in series and wired across the two outputs of the two switch networks Sn. The point where switches Sn1 and Sn2 are connected together corresponds to the output of switch network Sna.

Figure 1G:
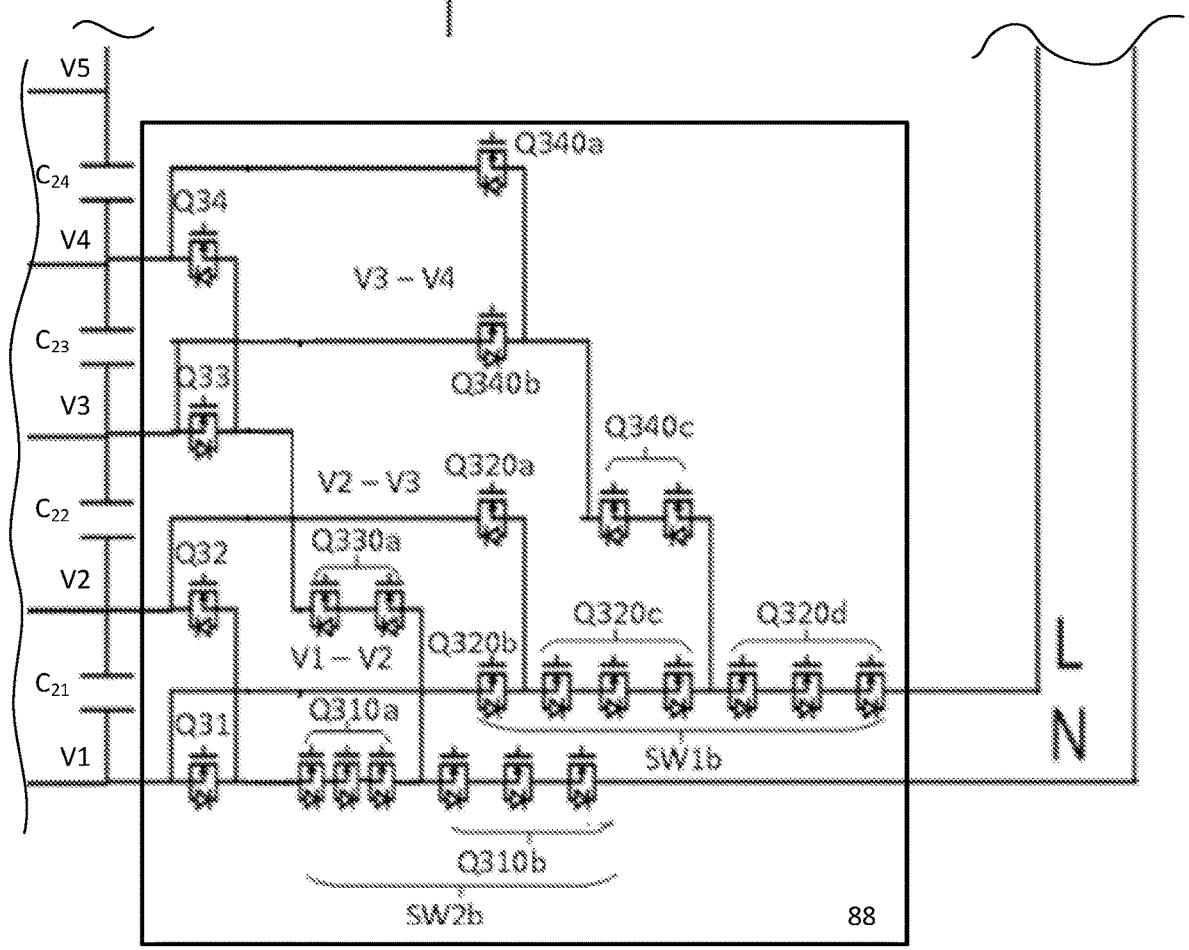
FIG. 1G illustrates details of a multiplexor, according to illustrative aspects of the disclosure.

Reference is now made to FIG. 1G, which illustrates further details of multiplexor 88, according to illustrative aspects of the disclosure. In descriptions that follow, multiple switches wired in series such as switches Q340c, Q330a, and Q310a for example may be implemented with a single switch. The source of switch SW1a (not shown) may provide the live (L) output terminal of converters 107b/107c and is further connected to the drain of switch SW1b/Q320d. The source of switch SW2a (not shown) may provide the neutral (N) output terminal of converters 107b/c and is further connected to the drain of switch SW2b/Q310b. Switch SW1b may include switches Q320b, Q320c and Q320d. The source of switch Q320b connects to the source of switch Q31. In general switches Q31-Q34 may be included as part of a MIMO converter 12 and/or a selector unit 16. The drain of switch Q320b connects to the source of switch Q320c and the source of switch Q320a. The drain of switch Q320a connects to the drain of switch Q32. The drain of switch Q320c connects to the source of switch Q320d and to the source of switch Q340c. The drain of switch Q340c connects to the drain of switch Q340b and the source of switch Q340a. The drain of switch Q340a connects to the drain of switch Q34. The source of switch Q340b connects to the source of switch Q33. Switch SW2b may include switches Q310a where the drain of switch Q310a wired in series with the source switch Q310b. The point at which the drain of switch Q310a connects with the source switch Q310b also connects to the source of switch Q330a. The drain of switch Q330a connects to the drain of switch Q32. The drain of switch Q310b may provide the neutral (N) output terminal of converter 107b/107c.

The neutral (N) point of converters 107b/107c may connect to voltage terminal V1 via switches SW2a (not shown) and SW2b and body diode of switch Q31 and/or voltage terminal V2 via switch SW2a, SW2b and switch Q32. Further, the neutral (N) point of converter 107b/107c may connect to voltage terminal V3 via the body diodes of switches Q310b and Q330a then through and Q33 and/or voltage terminal V4 via the body diodes of switches Q310b and Q330a and through switch Q34.

In a similar way, the live (L) point of converters 107b/107c may connect to voltage terminal V1 via switches SW1a (not shown) and SW1b and/or from voltage terminal V2 via switch Q320a, switch Q320c and switch Q320d. Further, the live (L) point of converter 107b/107c may connect to voltage terminal V3 via switches Q340b, Q340c and Q320d and/or voltage terminal V4 via switches Q340a, Q340c and Q320d. In sum, MUX 88 may allow the live (L) or neutral (N) inputs of MUX 88 to be selectively connected to terminals V1, V2, V2-V3, V3 and V(n−1) via respective switches SW1b and SW2b.

Descriptions so far in general, and in greater detail in descriptions that follow, for converters may include cascade-able elements that are interchangeable in various combinations. For example, one or more outputs of one stage (e.g., a first converter) may be connected to one or more inputs of another stage (e.g., a second converter). Thus, for example, when A is cascaded with B, the outputs X and Y of A may be connected to the inputs of W and Z of B, respectively. The cascade-able elements may be configured for example to provide for the function of harmonic cancellation in a converter, reduce the occurrence of simultaneously high values of voltage and current. The reduction of simultaneously high values of voltage and current may therefore may reduce high-power dissipation values during the switching process. Additionally, the multi-level converter topologies described above and in descriptions that follow may provide multiple output voltage values. The multiple output voltage values may reduce the size of associated output filters, may minimize the number of switches utilized and enable the choice of switches that are cheaper.

Figure 1H:
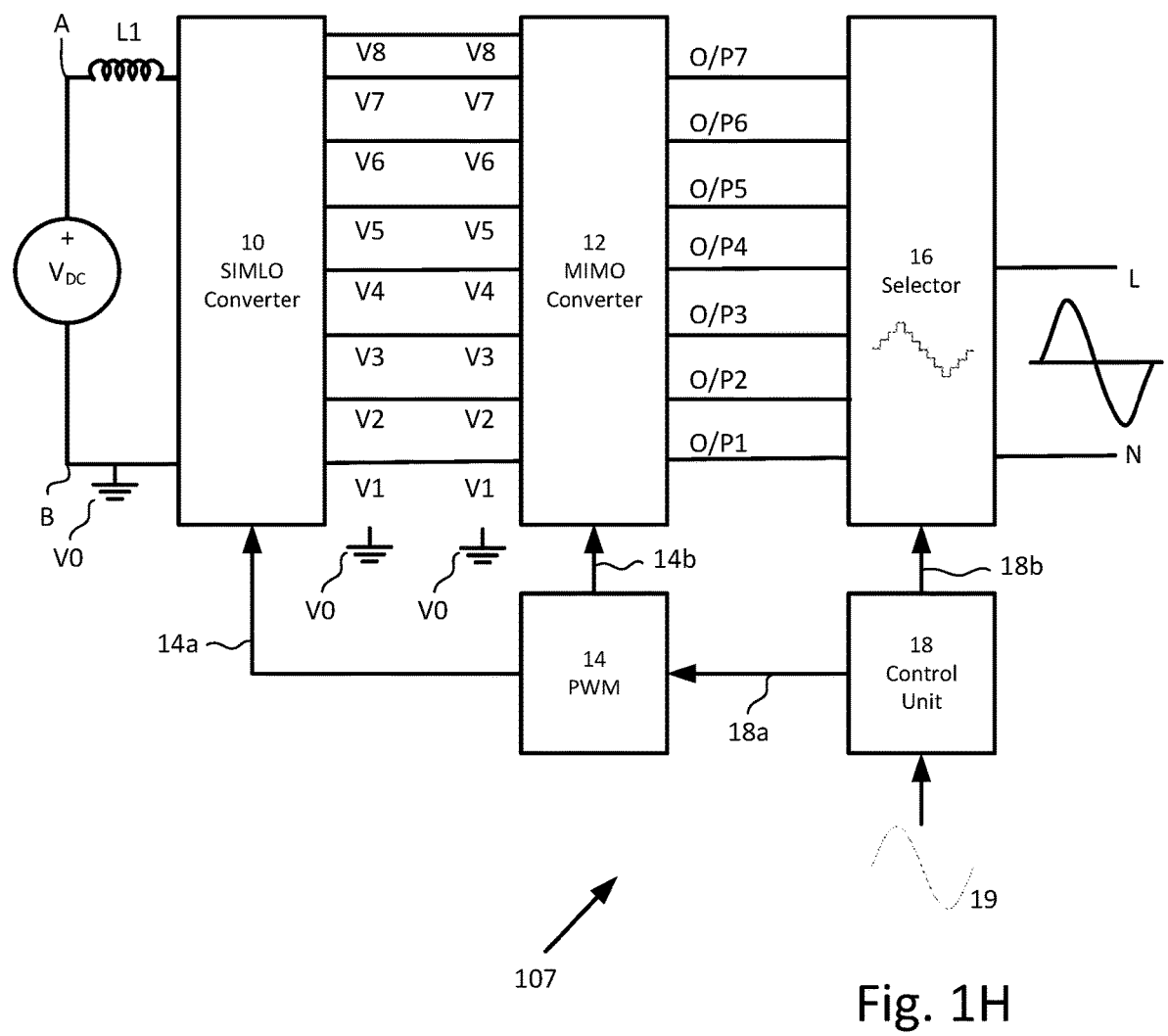
FIG. 1H illustrates a block diagram of details of a converter, according to illustrative aspects of the disclosure.

Reference is now made to FIG. 1H, which illustrates a generalized block diagram of further details of converter 107, according to illustrative aspects of the disclosure. The generalized block diagram also includes generalized SIMLO converter 10, MIMO converter 12 and selector unit 16. SIMLO converter 10 may be implemented as SIMLO converters 10a, 10b, 10c described above and below in the descriptions that follow. Similarly, MIMO converter 12 and selector unit 16 may be implemented respectively as MIMO converters 12a, 12b, 12c and selector units 16a, 16b, 16c described above and below in the descriptions that follow. MIMO converter 12 may comprise switching circuitry as shown in FIG. 1H and other figures. In general, reference to SIMLO converter 10, MIMO converter 12 and selector unit 16 is intended to include all the other embodiments of SIMLO converters, MIMO converters and selector units described above and below. Further, the embodiments described above and below for SIMLO converter 10, MIMO converter 12 and selector unit 16 may be cascaded together in a variety of combinations. For example, a cascade of SIMLO converter 10b, MIMO converter 12c and selector unit 16a may be utilized in some embodiments.

As described above, voltage $V_{DC}$ on terminals A and B may be the DC output of power system 100. Voltage $V_{DC}$ on terminals A and B may be another source of DC supply such as DC from a battery, DC generator, a photovoltaic panel or any other source of DC power. Voltage $V_{DC}$ may have a negative terminal (V0) that may connect to neutral (N), earth or ground, or may not connect to neutral (N), earth or ground. In some aspects, negative terminal (V0) may be galvanically isolated from neutral (N) and/or earth. If the negative terminal of voltage $V_{DC}$ is not connected to ground, voltage $V_{DC}$ may be referred to as a floating voltage. $V_{DC}$ as shown may be considered to be an example of a unipolar voltage. Voltage $V_{DC}$ may also be a bipolar voltage so that the input to SIMLO converter 10 may have three inputs: $V_{DC}/2$, 0 and $-V_{DC}/2$ for example. Voltage $V_{DC}$ may connect to the input of a single input multi-level output (SIMLO) converter 10. The positive terminal of voltage $V_{DC}$ may connect to the positive input of SIMLO converter 10 via inductor L1. SIMLO converter 10 may convert voltage $V_{DC}$ to eight discrete voltage levels of DC output voltage respectively on eight output terminals V1-V8 with respect to negative terminal V0. Eight output terminals V1-V8 with respect to negative terminal V0 of SIMLO converter 10 may connect to respective input terminals of multi input multiple output (MIMO) converter 12.

MIMO converter 12 may convert the discrete voltage levels (V1-V8) on its input to two discrete states of voltage level on each of seven outputs O/P1-O/P7. For example, the two discrete states of voltage provided on output O/P7 may be voltages V7 and V8, the two discrete states of voltage on output O/P6 may be voltages V6 and V7. The outputs O/P1-O/P7 may be summarized in Table 1 below.

TABLE 1

| O/P1 | O/P2 | O/P3 | O/P4 | O/P5 | O/P6 | O/P7 |
|---|---|---|---|---|---|---|
| V1 or V2 | V2 or V3 | V3 or V4 | V4 or V5 | V5 or V6 | V6 or V7 | V7 or V8 |

TABLE 1-continued

| O/P1 | O/P2 | O/P3 | O/P4 | O/P5 | O/P6 | O/P7 |
|---|---|---|---|---|---|---|

The two discrete values of voltage on each output (O/Pn, n=1-7) may alternate from one to each other by virtue of multiple pulse width modulation (PWM) signals from PWM unit 14. The PWM signals may be applied to the control inputs of the switches (not shown) of MIMO converter 12. The switches of MIMO converter 12 may provide two levels of voltage on each respective output O/P1-O/P7 by virtue of the PWM applied by PWM unit 14.

Controller 18 (e.g., control unit) may include two control line outputs and one input from reference waveform 19. Control line output 18a connects to a control input of PWM unit 14 and control line output 18b connects to a control input of selector unit 16. Control line output 14a connects to SIMLO convert 10 and control line 14b connects to MIMO converter 12. Control lines 18a and/or 18b may be provided respectively to PWM unit 14 and/or selector unit 16, responsive to parameters of reference waveform 19 and/or sensed parameters of converter 107. Controller 18 may additionally include a PWM unit similar to that of PWM unit 14 and supply a PWM control signal to selector unit 16 via control signal 18b. In general, according to features described in greater detail below, the PWM supplied to SIMLO converter 10 and/or MIMO converter 12 may be at a higher frequency compared to the frequency of PWM that may be supplied to selector unit 16.

Sensed parameters of converter 107 by sensors (not shown) may be included in control unit 18 or operatively connected to control unit 18. Selector unit 16 may provide a single-phase output shown as terminals live (L) and neutral (N). Further details of converter 107 and its operation are shown in the descriptions that follow. In sum, converter 107 may include an input connected to DC voltage $V_{DC}$ that may be converted by converter 107 to a single-phase AC output on terminals live (L) and neutral (N) for example. Additionally, the features described above and, in more detail, below for converter 107 may be repeatable and inter connected. Repeatable and interconnected features of converter 107 may provide, for example, a split phase and/or three phase AC output on output terminals of converter 107.

Figure 1I:
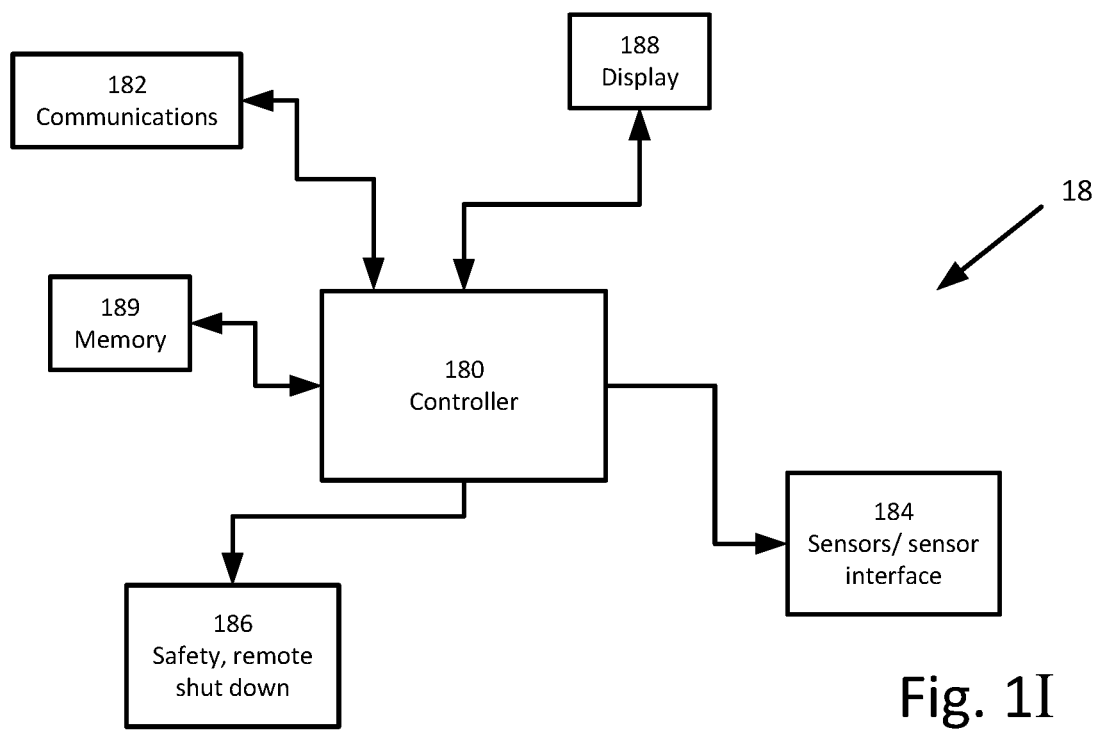
FIG. 1I shows a block diagram of details of a controller and the elements that it interfaces with, according to illustrative aspects of the disclosure.

Reference is now made to FIG. 1I, which shows a block diagram of further details of control unit 18, according to illustrative aspects of the disclosure. A controller 180 may include a microprocessor, microcontroller and/or digital signal processor (DSP) that may connect to a memory 189. Controller 180 may serve as a central controller to other controllers that may be included in power devices 103 for example. Communications interface 182 connected to controller 180 may provide communications between controller 180 and other controllers/communication interfaces included in power system 100 for example. The communications to and from communications interface 182 may be as a result of a control algorithm running on controller 180. The communications may include control signals provided on control lines 18a and 18b to control PWM unit 14 and/or selector unit 16. Communications in communications interface 182 may also include measured or sensed parameters via sensors/sensor interface 184. Sensors/sensor interface 184 may be included in and/or operably connected to SIMLO converter 10, MIMO converter 12 and selector unit 16. The communications by communications interface 182 may be conveyed by use of WiFi, power line communications (PLC), near field communications or RS232/485 communication bus, for example. Communications interface 182 may communicate with a local area network or cellular network in order to establish an internet connection that, for example, may provide a feature of remote monitoring/or reconfiguration of converter 107.

Display 188 connected to central controller 180 may be mounted on the surface of the housing of converter 107 for example. Display 188 may display, for example, the power produced from converter 107 that may be utilized by load 109 that may be measured by sensors/sensor interface 184.

Connected to controller 180 may be connected to safety and remote shutdown unit 186. Sensing by sensors/sensor interface 184 as well as sensed parameters communicated between controller 180 and sensors/sensor interfaces of SIMLO converter 10, MIMO converter 12 and selector unit 16 may be indicative of a fault condition. Upon detection of a fault, remote shutdown unit 186 may be activated in order to isolate the fault condition and/or shutdown converter 107, for example.

Figure 1J:
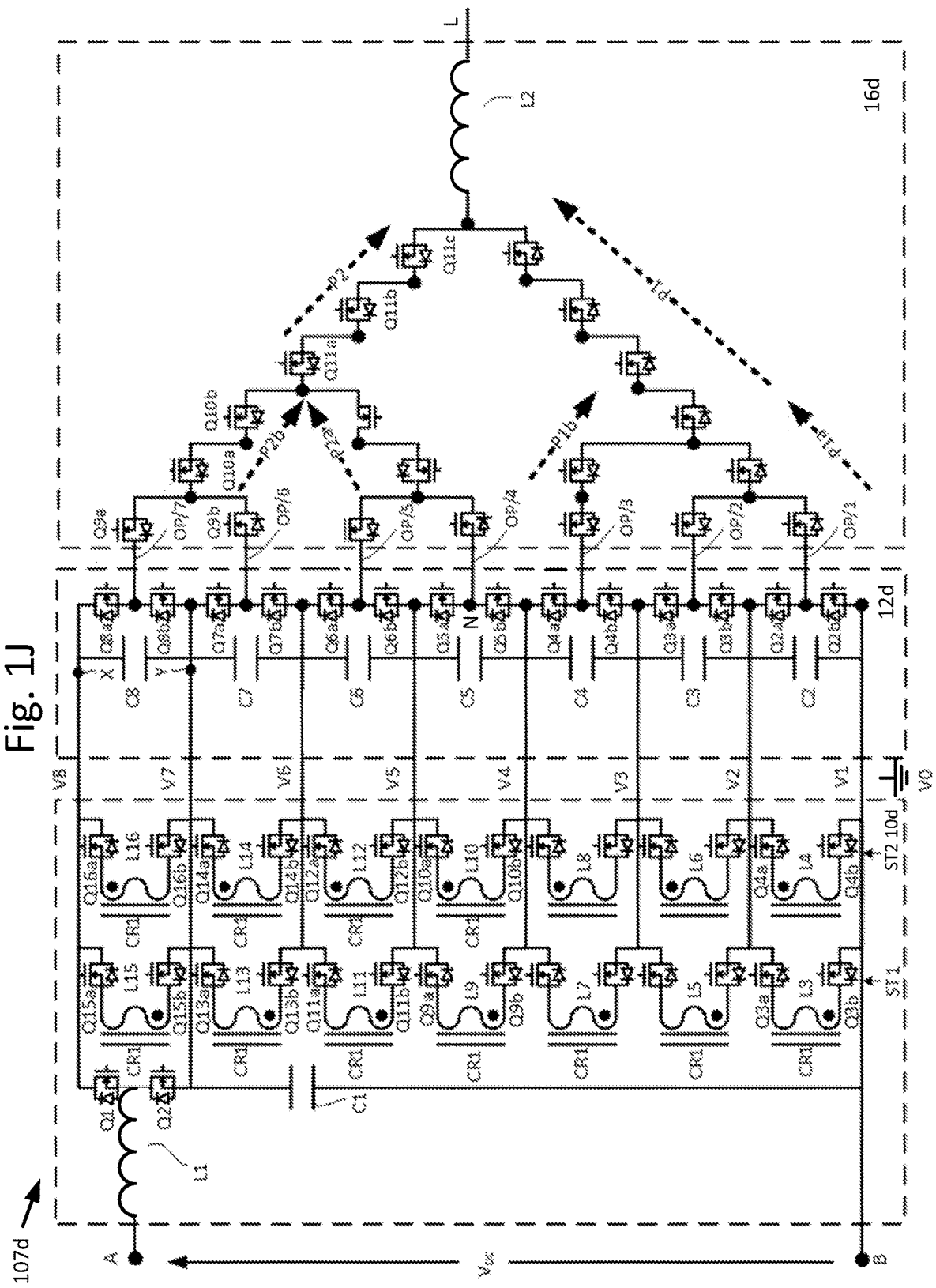
FIG. 1J shows a block diagram of details of a single input multi-level output (SIMLO) converter, a multi input multi output (MIMO) converter and a selector unit, according to illustrative aspects of the disclosure.

Reference now made to FIG. 1J, which shows a block diagram of further details of SIMLO converter 10d, MIMO converter 12d and selector unit 16d, according to illustrative aspects of the disclosure. Switches shown in SIMLO converter 10d, MIMO converter 12d and selector unit 16d are shown as metal oxide semiconductor field effect transistors (MOSFETs). Switches shown in SIMLO converter 10d may also include other solid-state semiconductor switches and/or electro-mechanical switches such as relays, for example. The cascaded series of stages in the processing chain of electrical powers and the further details SIMLO converter 10d, MIMO converter 12d and selector unit 16d may be utilized in converter 107 as shown in FIG. 1A.

Voltage $V_{DC}$ at nodes A and B connects to the input of a single input multi-level output (SIMLO) converter 10d via inductor L1. The other end of inductor L1 connects to the point where two switches Q1 and Q2 are connected in series. The other ends of switches Q1 and Q2 connect respectively to terminal V8 and one end of capacitor C1. The other end of capacitor C1 connects to node B. Two series strings ST1 and ST2 of inductors connect between terminals V8 and V1 and/or node B. Using inductor L11 as an example that may apply for each of the inductors in series strings ST1 and ST2, inductor L11 may include a switches Q11a and Q11b wired in series on either side of inductor L11. In a similar way, inductor L12 may include a switches Q12a and Q12b wired in series on either side of inductor L1. Switch, Q11a is wired in series with switch Q13b and switch Q12a is wired in series with switch Q14b. The point where Q11a is wired in series with switch Q13b and switch Q12a is wired in series with switch Q14b may be further connected together to provide terminal V6. In a similar way, the point where Q11b wired in series with switch Q9a and switch Q12b may be wired in series with switch Q14b and these two series connections may be further connected provides terminal V5. The gate of switch Q12a connects to terminal V6 in a similar way that the gate of switch Q10a connects to terminal V5. The gates of switches Q11a, Q11b and Q12b may receive PWM from PWM unit 14 via control line output 14a.

Inductor L11 and inductor L12 as with the other inductor pairs may be both electrically connected together and also electro-magnetically connected together by virtue of the mutual inductance between inductor pairs of inductors L11 and L12, L15 and L16 etc., being wound on the same core CR1 that may run throughout the length of strings ST1 and ST2. Inductor pairs may have the same number of winding turns, and each inductor pair may form what may be referred to as auto transformer circuits with primary windings (e.g., L3, L5, to L15) and secondary windings (L4, L6, to L16). There can be a different number of turns to each of the inductor pairs. The different number of turns may allow an adjustment of the typical relative maximum power point (MPP) voltage of each of the voltages on terminals V1-V8, for example. Additionally, with respect to inductors L15 and L16, terminal V7 also connects to capacitor C1 where capacitor C1 connects to switch Q2.

SIMLO converter 10d may be provided with a circuit for a separating of direct current (DC) input power ($V_{DC}$). The separating may provide multiple direct current (DC) voltage outputs on terminals V1-V8 by use of multiple tapped inductors. Tapped inductors may include respective primary ends, secondary ends and taps connected to terminals V1-V8. The taps provided between a series connection of inductors (L13 and L11, or L14 and L12 for example) and between two series connected switches (Q13b and Q11a, or Q14b and Q12a for example). The taps may be adapted for connecting individually to the DC voltage outputs (terminals V1-V8). Each tapped inductor may form a switched auto transformer circuit with both electrical and electro-magnetic connections. The electrical and electro-magnetic connections may be operated so that multiple direct current (DC) voltage outputs may be provided on terminals V1-V8. The multiple direct current (DC) voltage outputs may be derived from converting the input voltage ($V_{DC}$) by SIMLO converter 10d. Operation and control of the switched auto transformer circuits may include control signal 14b from PWM unit 14, for example.

The single input multi-level output SIMLO converter 10d via inductor L1, where L1 connects to the point where two switches Q1 and Q2 may be connected in series. The other ends of switches Q1 and Q2 connected to the auto transformer circuits may provide a way of operation to the input of SIMLO converter 10d. A central controller (not shown) such as controller 180, for example, may sense electrical parameters in power system 100 and/or converter 107d to operate switches Q1 and Q2 and/or the auto transformer circuits. The way of operation therefore may be to provide a buck, boost, buck/boost and/or buck+boost operation on voltage $V_{DC}$ that may be the DC output of power system 100 for example. The electrical parameters sensed by sensors/sensor interface 184 for example may be voltage, current, impedance, resistance, phase angle, power factor, level of harmonic distortion, frequency or power. Control line output 14a may be used send control signals to SIMLO converter 10 to provide appropriate control of SIMLO converter 10 responsive to the sensed electrical parameters.

Two switches Q8a and Q8b connected in series across capacitor $C_8$ at nodes X and Y may present an input to a two-level inverter topology to the DC potential difference between terminals V8 and V7 applied to the input. The alternating current (AC) output O/P7 of the two-level inverter topology may be derived from the mid-point connection between switches Q8a and Q8b. A three-level and/or multilevel inverter topology may be implemented to provide an input between nodes X and Y so that alternating current (AC) output O/P7 may be a three-level and/or multilevel AC voltage.

Seven voltages or more may be output from SIMLO converter 10d to the input of MIMO converter 12d, i.e., the seventh voltage is the potential difference between output terminals V7 and V8, the sixth voltage is the potential difference between output terminals V7 and V8 and so on.

Capacitor $C_2$ connects across terminals V1 and V2 and capacitors $C_3$-$C_8$ connect across respective terminals, such that $C_3$ connects across terminals V2 and V3 and so on. By way of example using capacitor $C_8$ for all other capacitors $C_2$-$C_7$, two switches Q8a and Q8b connect in series across capacitor $C_8$. The mid-point connection between switches Q8a and Q8b provides output O/P7 of MIMO converter 12d. The mid-point connection between switches Q5a and Q5b may provide the neutral (N) connection point output of MIMO converter 12d and the neutral (N) output terminal of converter 107d/selection unit 16d. Selection unit 16d may comprise a plurality of interconnected switches (e.g., Q9a, Q9b, Q10b, Q11a, Q11b, Q11c, etc.) configured to output an output voltage on a selected output terminal. The mid-point connection between switches Q5a and Q5b may provide a symmetrical output of converter 107/selection unit 16 that may provide for the function of harmonic cancellation in converter 107. The other mid-point connections between the switches MIMO converter 12d in general also may serve to provide the neutral (N) connection point output of MIMO converter 12d and the neutral (N) output terminal of converter 107d/selection unit 16d. The gates of switches Q8a and Q8b as with the gates of the other switches of MIMO converter 12d may receive PWM from PWM unit 14 via control line output 14b.

The seven voltages output from MIMO converter 12d on outputs O/P1-O/P7 may be input into respective inputs of selection unit 16d as shown. The switches of selection unit 16d may be connected and operated to provide two main paths P1 and P2 (shown by dotted line and arrow) that connect to the output of selector unit 16 via inductor L2. Inductor (filter) L2 may provide a filtering of the AC voltages provided from paths P1 and/or P2.

Path P1 may be supplied from sub paths P1a and/or P1b and path P2 may be supplied by sub paths P2a and/or P2b. Selection by selection unit 16d of the paths may be by the PWM supplied to selection unit 16d. The PWM may be at a lower frequency compared to the frequency of PWM that may be supplied to SIMLO converter 10d and/or MIMO converter 12d. As mentioned previously, MIMO converter 12d may convert the discrete voltage levels (V1-V8) on its input to two discrete states of voltage level on seven outputs O/P1-O/P7.

By way of non-limiting example, reference is made to path P2, which may be supplied from outputs O/P7, O/P6, O/P5 or O/P4. If output O/P7 is required to appear on the output of selector unit 16d, PWM may be applied to the gates of switches Q9a, Q10a, Q10b to provide sub path P2b. PWM applied to the gates of switches Q11a, Q11b and Q11c to provide path P2 while all other switches in selector unit 16d are OFF. Similarly, if output O/P6 is required to appear on the output of selector unit 16d, PWM may be applied to the gates of switches Q9b, Q10a, Q10b to provide sub path P2b. PWM applied to switches Q11a, Q11b and Q11c to provide path P2 while all other switches in selector unit 16d are OFF. Path P2 may be supplied by sub path P2a by operation of switches connected to outputs O/P5 and O/P4 in a similar way as with respect to outputs O/P6 and O/P7 described above. Path P1 may also supplied from outputs O/P3, O/P2 and/or O/P1 similar as that described with respect path P2 described above.

Figure 2A:
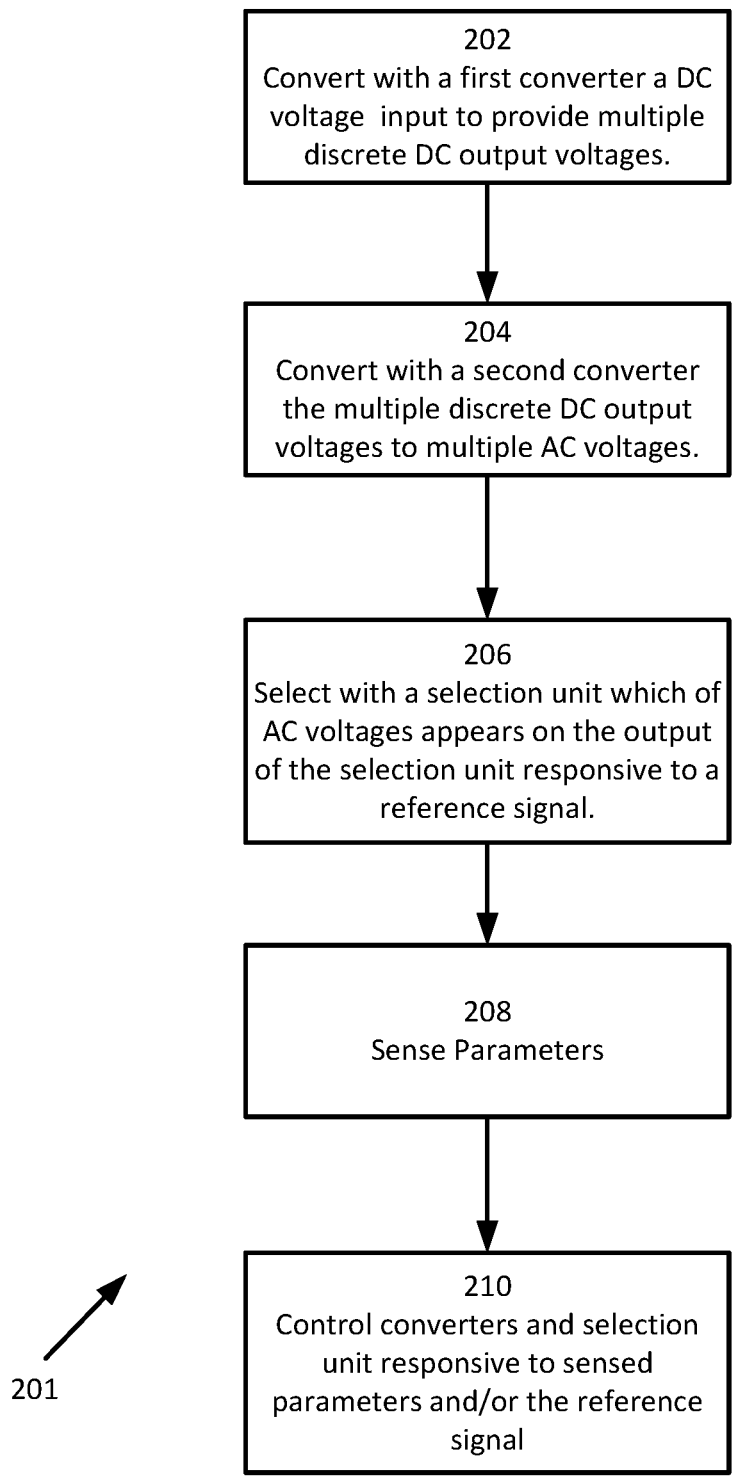
FIG. 2A shows a flow chart of a method for the operation of a converter, according to illustrative aspects of the disclosure.

Reference is now made to FIG. 2A, which shows a flow chart of an example method 201 for the operation of converter 107d. The flow chart of method 201 may be used in general to describe the operation of interconnected and/or cascaded components of converter 107. Steps 202, 204, 206, 208, and 210 of method 201 may be considered to be operating at substantially the same time by virtue of the cascaded stages in the processing chain of electrical powers converted by SIMLO converter 10/MIMO converter 12 and selected by selector unit 16.

Operation of SIMLO Converter 10d

At step 202, voltage $V_{DC}$ applied at the input of SIMLO converter 10d may be converted to provide multiple direct current (DC) voltage outputs on terminals V1-V8. In other words, SIMLO converter 10d may be a circuit for separating a direct current (DC) input power ($V_{DC}$ for example) to provide multiple direct current (DC) voltage outputs on its output terminals V1-V8.

As part of what may be included in step 210, controller 180 as an example of a central controller may sense electrical parameters in power system 100 and/or converter 107/107d at step 208. Step 210 includes operation of switches Q1 and Q2 connected to inductor L1 and capacitor C1 and/or the auto transformer circuits. The auto transformer circuits may for example include inductor pairs of inductors such as L15 and L16 and four switches Q15a, Q15b, Q16a and Q16b to give a converter circuit function. The converter circuit provides may be a buck, boost, buck/boost and/or buck+boost operation on voltage $V_{DC}$. Alternatively, converter 1000 may be utilized instead of or in addition to the auto transformer circuits to provide a buck, boost, buck/boost and/or buck+boost operation on voltage $V_{DC}$. The electrical parameters sensed by sensors/sensor interface 184, for example, may be voltage, current, impedance, resistance and/or power (P). Power P may be a calculation using sensed voltage (V) multiplied (x) by sensed current (I). The calculation performed by controller 180, for example. Control line output 14a may be used to send control signals to SIMLO converter 10d for appropriate control of SIMLO converter 10d to provide a buck function on voltage $V_{DC}$. The buck function on voltage $V_{DC}$ may be to step down the voltage level of voltage $V_{DC}$ if too high whilst stepping up the input current from voltage $V_{DC}$ responsive to the sensed electrical parameters. Whereas in contrast, a boost function on voltage $V_{DC}$ may step up the voltage level if $V_{DC}$ is too low whilst stepping down the input current from voltage $V_{DC}$ responsive to the sensed electrical parameters. Responsive to the electrical parameters sensed by sensors/sensor interface 184, configuration of inductor pairs and switches may provide where appropriate the buck, boost, buck/boost and/or buck+boost operation on voltage $V_{DC}$.

Control signals provided on control line output 14a may also include control signals with respect to the operation of the auto transformer circuits. The operation may provide multiple direct current (DC) voltage outputs on the output terminals V1-V8 of SIMO converter 10d. Operation of the auto transformer circuits by use of multiple tapped inductors of the auto transformer circuits may include respective primary ends, secondary ends and taps connected to terminals V1-V8. The taps provided between a series connection of inductors may be L13 and L11, or L14 and L12 and between two series connected switches may be switches Q13b and Q11a, or Q14b and Q12a, for example. The taps may be adapted for connecting individually to the DC voltage outputs (terminals V1-V8). Each tapped inductor therefore may form a switched auto transformer circuit with both electrical and electro-magnetic connections. The switched auto transformer circuit may be operated so that multiple direct current (DC) voltage outputs may be provided on terminals V1-V8. The voltage outputs may be derived from converting the input voltage ($V_{DC}$) by SIMLO converter 10d.

Control signals on control line output 14a may be by a first modulation scheme responsive to the electrical parameters sensed at step 208. The first modulation scheme may include pulse width modulation (PWM), frequency modulation (FM) or a variable frequency and variable pulse width. Control signals on control line output 14a may include consideration of reference waveform 19 and the effect of a load connected to the output of selector unit 16. The control signals may be responsive to sensing step 208 so that the DC voltage outputs on terminals V1-V8 may be set and maintained at the required DC levels. PWM from PWM unit 14 may be applied to the gate connections of the switches of SIMLO converter 10d via control line output 14a.

Operation of MIMO Converter 12d

At step 204, MIMO converter 12d may convert the discrete voltage levels (V1-V8) on its input to two discrete states of alternating current (AC) voltage level on each of seven outputs O/P1-O/P7. The switches of MIMO converter 12d may provide two levels of voltage on each respective output O/P1-O/P7. Two levels of voltage on each respective output O/P1-O/P7 may be by virtue of the PWM applied by PWM unit 14 on control line output 14b to the gates of the switches of MIMO converter 12d. The PWM on control line output 14b may be provided by controller 180 (as part of control step 210) responsive to sensed electrical parameters of converter 107/107d at step 208. The sensed electrical parameters of converter 107 may include the discrete voltage levels (V1-V8) and the effect of a load connected to the output of selector unit 16. The sensed electrical parameters of converter 107 may further include consideration of reference waveform 19.

For example, the two discrete states of voltage provided on output O/P7 may be voltages V7 and V8, the two discrete states of voltage on output O/P6 may be voltages V6 and V7. The outputs O/P1-O/P7 may be summarized as shown in Table 1 above. By way of example, two switches Q8a and Q8b connected in series across capacitor $C_8$ at nodes X and Y may present an input to a two-level inverter topology. The DC potential difference between terminals V8 and V7 applied to the input of the two-level inverter topology. The alternating current (AC) output O/P7 of the two-level inverter topology may be derived from the mid-point connection between switches Q8a and Q8b. A three-level and/or multilevel inverter topology may be implemented to provide an input between nodes X and Y. Therefore, alternating current (AC) output O/P7 may be a three-level and/or multilevel AC voltage.

Operation of Selection Unit 16d

At step 206, the seven voltages output from MIMO converter 12d on outputs O/P1-O/P7 may be input into respective inputs of selection unit 16d. Referring again to FIG. 1J, the switches of selection unit 16d may be connected and operated to provide two main paths P1 and P2 (shown by dotted line and arrow). Paths P1 and P2 connect to the output of selector unit 16d via inductor L2. Inductor (filter) L2 may provide a filtering of the AC voltages provided from paths P1 and/or P2. Path P1 may be supplied from sub paths P1a and/or P1b and path P2 may be supplied by sub paths P2a and/or P2b. Selection by selection unit 16 of the paths may be the PWM supplied to selection unit 16d. The PWM may be at a lower frequency compared to the frequency of PWM that may be supplied to SIMLO converter 10d and/or MIMO converter 12d.

By way of non-limiting example, reference is made to path P2 that may be supplied from outputs O/P7, O/P6, O/P5 or O/P4. If output O/P7 is required to appear on the output of selector unit 16d, PWM may be applied to switches Q9a, Q10a, Q10b to provide sub path P2b. PWM applied to switches Q11a, Q11b and Q11c to provide path P2 while all other switches in selector unit 16d are OFF. Similarly, if O/P6 is required to appear on the output of selector unit 16d, PWM may be applied to switches Q9b, Q10a, Q10b to provide sub path P2b. PWM applied to switches Q11a, Q11b and Q11c to provide path P2 while all other switches in selector unit 16d are OFF. Path P2 may be supplied by sub path P2a by operation of switches connected to outputs O/P5 and O/P4. In a similar way, P2 may be supplied by sub path P2b by operation of switches connected to outputs O/P6 and O/P7 described above. Path P1 may also supplied from outputs O/P3, O/P2 and/or O/P1 similar as that described with respect path P2 described above.

Figure 2B:
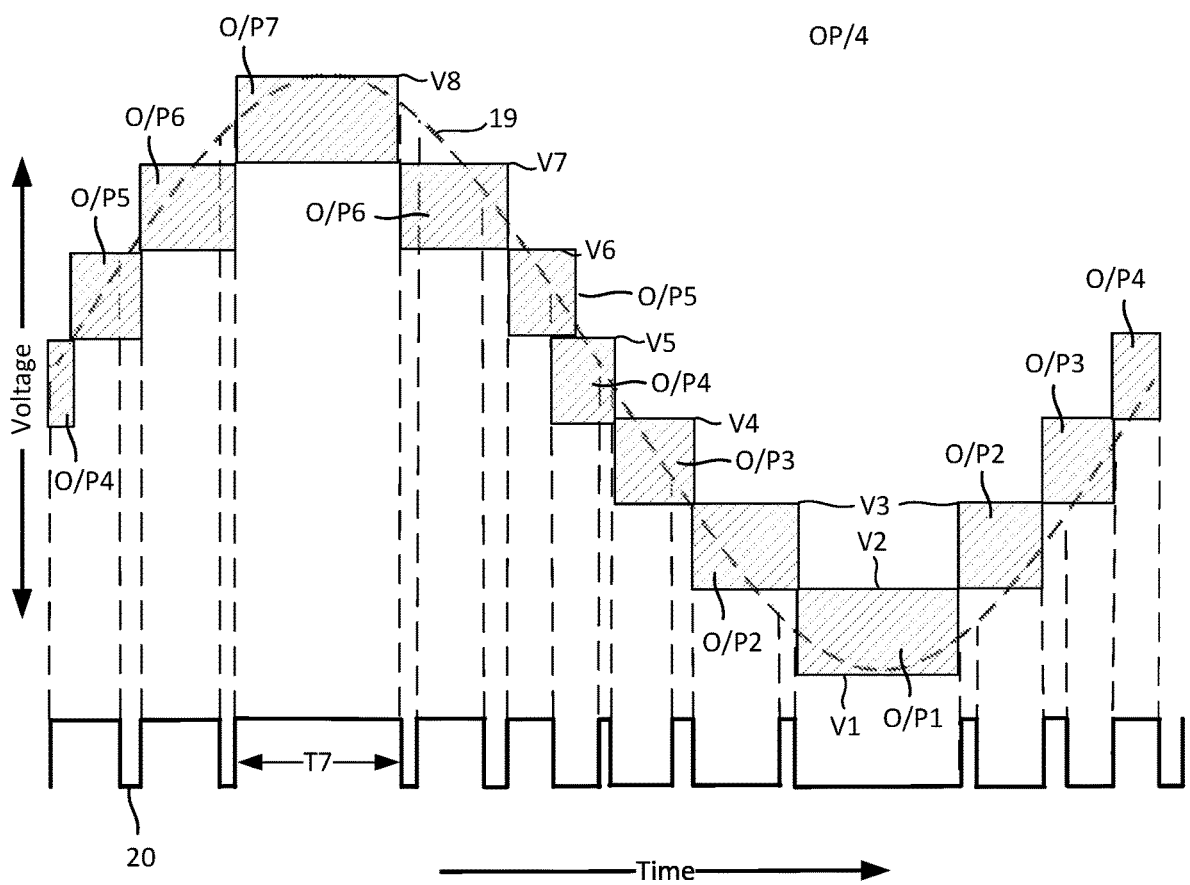
FIG. 2B shows graphical waveforms to illustrate the operation of a converter, according to illustrative aspects of the disclosure.

Reference is now made to FIG. 2B, which shows graphical waveforms to illustrate the operation of converter 107d, according to illustrative aspects of the disclosure. Waveforms are shown with horizontal axis of time (no numerical values specified) versus voltage on the vertical axis (no units specified). Reference waveform 19 is shown as a sinewave by dotted line. Reference waveform 19 may be a sinewave, triangular wave, square wave or any periodic waveform. Reference waveform 19 may be considered to be representative of the desired output of converter 107d. Control signals on control lines 18a and/or 18b may be provided respectively to PWM unit 14 and selector unit 16d. Control signals on control lines 14a and 14b may be provided respectively to SIMLO converter 10d and MIMO converter 12d responsive to parameters of reference waveform 19 and/or sensed parameters of converter 107d.

The parameters of reference waveform 19 may include the desired voltage amplitude and frequency of the output from converter 107d. For example, where load 109 may be a utility grid or single-phase AC motor, the desired voltage and frequency may be 220 Volts (V) and 50 Hertz (Hz) respectively. Electrical parameters sensed by sensors/sensor interface 184 and appropriate signals on control lines 18a, 18b, 14a and 14b may provide appropriate control of converter 107d. Appropriate control of converter 107d may be to ensure correct levels of operating voltage, current, impedance, resistance, phase angle, power factor, level of harmonic distortion, frequency and/or power for example.

Referring back to FIG. 2A, at step 202, voltage $V_{DC}$ applied at the input of SIMLO converter 10d may be converted to provide multiple direct current (DC) voltage outputs on terminals V1-V8. Voltage outputs V1-V8 may be shown by the horizontal lines of the shaded rectangles that represent the outputs from MIMO converter 12d on outputs O/P1-O/P7 provided at step 204. By way of example, referring to output O/P7, the two discrete states of voltage provided on output O/P7 may be voltages V7 and V8. Output O/P7 being voltages V7 and V8 may be because MIMO converter 12d, in general, may convert the discrete voltage levels (V1-V8) on its input to two discrete states of AC voltage. The two discrete states may be provided on each of seven outputs O/P1-O/P7. The PWM used to drive both converters 10d and/or 12d in general may be much higher in frequency than PWM control signal 20 applied to selection unit 16.

During time period T7 of PWM control signal 20, output O/P7 switches between levels V8 and V7 many times during time period T7. During time period T7, referring again to FIG. 1J, PWM control signals 20 may be applied to switches Q9a, Q10a, Q10b. PWM control signals may provide sub path P2b. PWM control signal 20 applied to switches Q11a, Q11b and Q11c to provide path P2 while all other switches in selector unit 16d are OFF. All other switches in selector unit 16d OFF means that the two discrete states of AC voltage provided on output O/P7 appears on the output of converter 107d.

In a similar way, PWM control signals 20 may be applied to switches Q9b, Q10a, Q10b to provide sub path P2b. PWM control signal 20 applied to switches Q11a, Q11b and Q11c to provide path P2 while all other switches in selector unit 16d are OFF. All other switches in selector unit 16d are OFF so that the two discrete states of AC voltage provided on output O/P6 appears on the output of converter 107d. PWM control signal 20 may be the PWM signal applied to selector unit 16d via control line 18b. PWM signal applied to selector unit 16d may be to select which outputs O/P1-O/P7 appear on the output of converter 107d as part of step 206. PWM control signal 20 may be applied to selection unit 16d included in control step 210 responsive to reference signal 19 and/or sensed parameters of converter 107d at step 208.

Figures 2C, 2D:
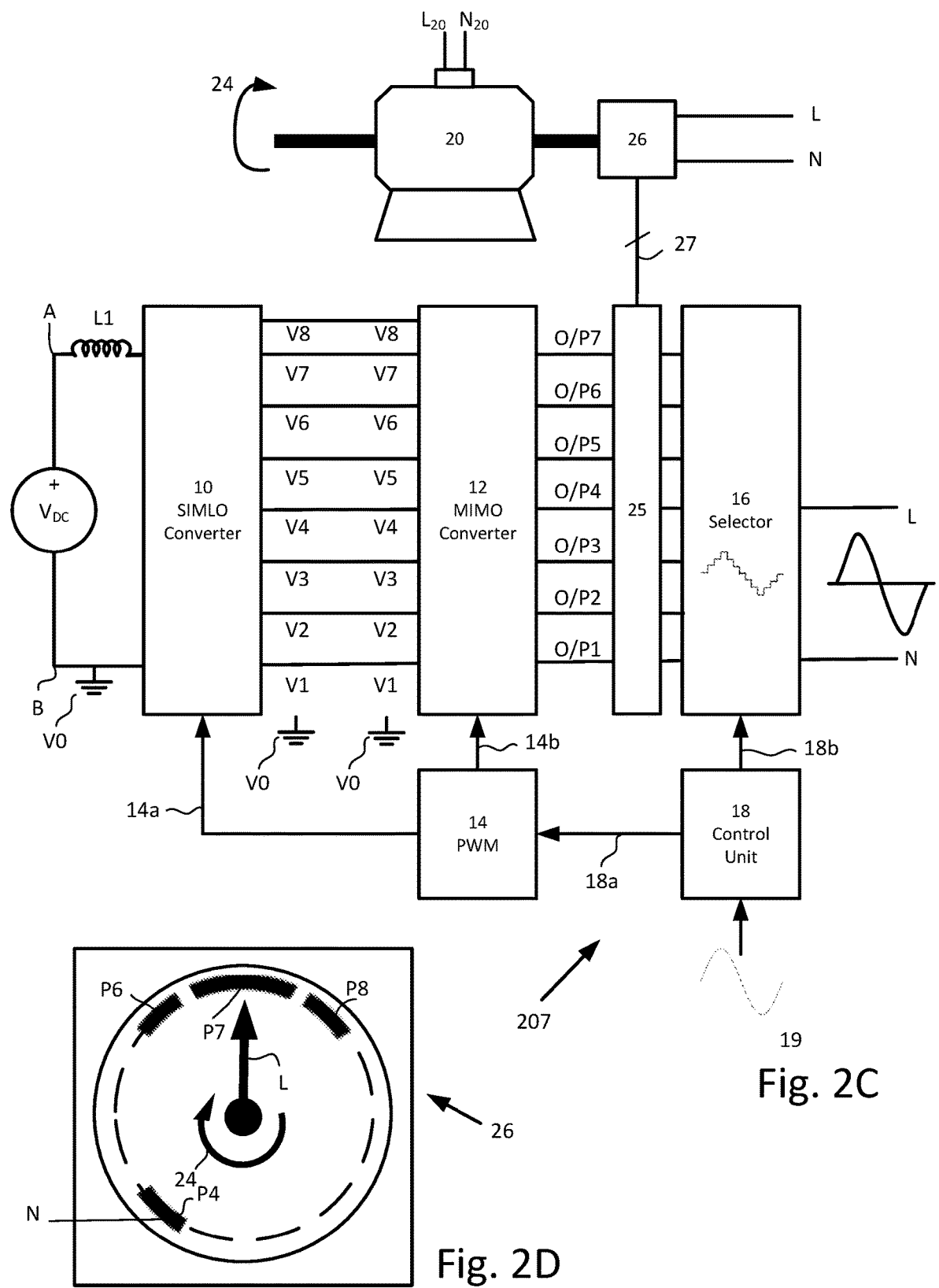
FIG. 2C illustrates a block diagram of a converter, according to illustrative aspects of the disclosure.
FIG. 2D shows further details of a rotary switch that may be included as part of the converter of FIG. 2C, according to illustrative aspects of the disclosure.

Reference is now made to FIG. 2C, which illustrates a block diagram of a converter 207, according to illustrative aspects of the disclosure. Converter 207 is the same as converter 107 shown in FIG. 1H but with the addition of a junction box 25, generator 20 and rotary switch 26. Further reference is also made to FIG. 2D, which shows a partial plan view of rotary switch 26 that includes some of poles P1-P7 (poles not shown are represented by dashed line). Generator 20 may be rotated (shown by rotation 24) by a turbine, for example, so that generator 20 generates electricity as a single-phase supply on live $L_{20}$ and neutral $N_{20}$. Generator 20 may also generate a three-phase supply of electricity. The single-phase supply on live $L_{20}$ and neutral $N_{20}$ may connect to the single-phase supply provided on live L and neutral N of rotary switch 26 and/or the single-phase supply provided on live L and neutral N of selector unit 16. Specifically, converter 207 according to descriptions below may provide a combined and synchronized single phase outputs from generator 20 and rotary switch 26, when rotary switch 26 is used instead of selector unit 16. The combined and synchronized single phase outputs may be by virtue of rotation 24 of the rotor of generator 20 to provide a way to synchronize the AC of converter 207 (at the output of MIMO converter 12) to the AC generated by generator 20.

In general, converter 207 may be operated to include the single-phase output of selector unit 16 as described above, the single-phase output of generator 20 or the combined and synchronized single phase outputs from generator 20 and rotary switch 26.

A possible electro-mechanical implementation of selector unit 16 described above may be to use rotary switch 26 with terminals/poles P1-P7 connectable to the output terminals of MIMO converter 12 by way of junction box 25 and multi-core cable 27. A pole of rotary switch 26 may provide the AC output voltage similar to that of selector unit 16 responsive to the velocity of rotation 24 of a rotor/shaft of rotary switch 26. The rotation 24 of a rotor of rotary switch 26 may be used to implement an electro-mechanical equivalent of PWM control signal 20, where time T7 and corresponding arc length for the pole of output O/P7 is greater than the corresponding arc length for the pole of output O/P6 for example. The physical arc length of poles P1-P7 of rotary switch 26 may allow for more and/or less time for an output of the output terminals of MIMO converter 12 to be ON. Poles P1-P7 of rotary switch 26 are connected to outputs of MIMO converter 12 on its outputs O/P1-O/P7 in junction box 25. Therefore, converter 207 may be operated to include the single-phase output of selector unit 16 as described above, the single-phase output of generator 20 or the combined and synchronized single phase outputs from generator 20 and rotary switch 26.

The rotor of rotary switch 26 may be rotated so that rotation 24 may be at three thousand revs per minute (RPM), for example. Three thousand revolutions per minute (RPM) may be derived from the following equation for generator 20 with n=two poles at a frequency $$f = 50 \text{ Hz: speed(RPM)} = \frac{60 \times f}{n}$$

Speed of three thousand revolutions per minute (RPM) gives a frequency output of 50 Hertz (Hz) for the AC output voltage of rotary switch 26. Rotation 24 of the rotor of generator 20 may provide a way to synchronize the AC of MIMO converter 12 to the AC generated by generator 20 on live $L_{20}$ and neutral $N_{20}$. Therefore, a combined and synchronized single phase outputs from generator 20 and rotary switch 26 may be achieved when rotary switch 26 is used instead of selector unit 16 to provide an electro-mechanical equivalent of PWM control signal 20.

Figure 3A:
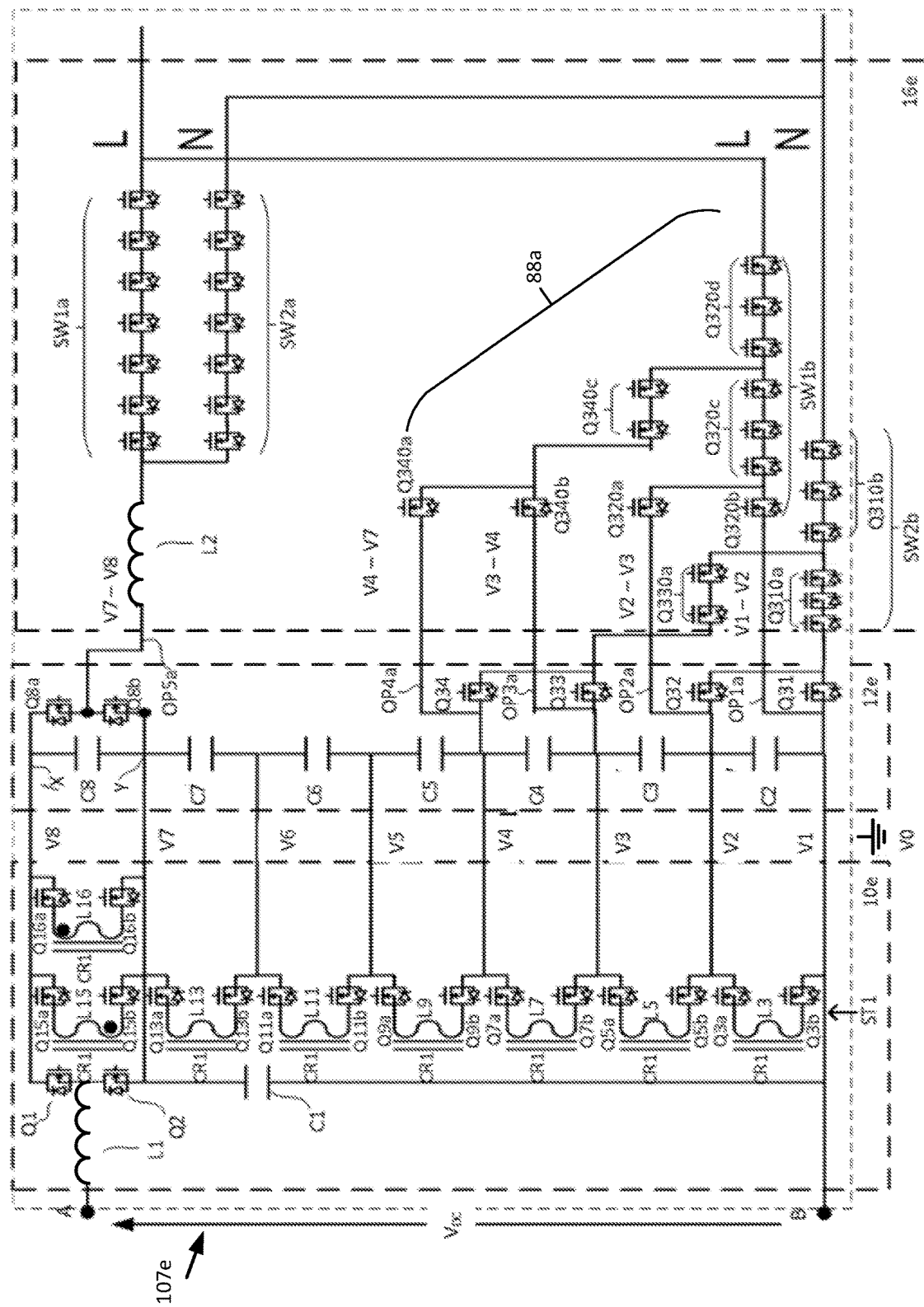
FIG. 3A shows a diagram of details of another SIMLO converter, MIMO converter and a selector unit, according to illustrative aspects of the disclosure.

Reference now made to FIG. 3A, which shows a block diagram of further details of SIMLO converter 10e, MIMO converter 12e and selector unit 16e, according to illustrative aspects of the disclosure. Switches shown in SIMLO converter 10e, MIMO converter 12e and selector unit 16e may be shown as metal oxide semiconductor field effect transistors (MOSFETs). Switches may also include other solid-state semiconductor switches and/or mechanical switches. The cascaded connection of the further details SIMLO converter 10e, MIMO converter 12e and selector unit 16e may be one of many implementations that may be utilized to implement converter 107 shown in FIG. 1A. The further details SIMLO converter 10e, MIMO converter 12e and selector unit 16e may be considered to have both some similar and dissimilar component implementations and/or functions of respective SIMLO converter 10, MIMO converter 12 and selector unit 16 shown in FIG. 1J. Similar components and are given the same reference number in the description below.

The positive terminal of voltage $V_{DC}$ may connect to the positive input of SIMLO converter 10e via inductor L1. SIMLO converter 10e may convert voltage $V_{DC}$ to seven discrete voltage levels of DC output voltage respectively on eight output terminals V1-V8 with respect to negative terminal V0. The other end of inductor L1 connects to the point where two switches Q1 and Q2 are connected in series. The other ends of switches Q1 and Q2 connect respectively to terminal V8 and one end of capacitor C1. The other end of capacitor C1 connects to node B.

Series string ST1 may include a series string of inductors connected between terminals V8 and V1 and/or node B. Using inductor L11 as an example that may apply for each of the inductors in series string ST1, inductor L11 may include switches Q11a and Q11b wired in series on either side of inductor L11. In a similar way, inductor L9 may include switches Q9a and Q9b wired in series on either side of inductor L9. The inductors in series string ST1 may be wound around core CR1. The connection between switches Q13b and Q11a provide voltage terminal V6 and in a similar way the connection between switches Q11b and Q9a provide voltage terminal V5. A further feature similar to that shown in FIG. 1J, inductor L15 is connected in parallel across inductor L16 and via switches Q16a and Q16b wired in series with inductor L16. Inductor L15 may also electromagnetically coupled to inductor L16 by virtue of inductor L16 also wound on core CR1. In sum, series string ST1 forms an auto transformer between terminals V8 and V1. The auto transformer may include an inductor pair of inductors L15 and L16 and four switches Q15a, Q15b, Q16a and Q16b. The auto transformer may provide a buck, boost, buck/boost and/or buck+boost operation on voltage $V_{DC}$. Alternatively, converter 1000 may be utilized instead or in addition to the auto transformer circuits. Converter 1000 may therefore, provide a buck, boost, buck/boost and/or buck+boost operation on voltage $V_{DC}$. Gates of switches Q15a and Q16a may be connected terminal V8 and the gate of switch Q13a connects to terminal V7. All other gates of the remaining switches of SIMLO converter 10e may connect to control line 14a of PWM unit 14.

In MIMO converter 12e, capacitor $C_2$ connects across terminals V1 and V2. Capacitors C3-C8 connect across respective terminals, such that C3 connects across terminals V2 and V3, C4 connects across terminals V3 and V4 and so on. Two switches Q8a and Q8b connect in series across capacitor $C_8$. The mid-point connection between switches Q8a and Q8b provides output to inductor L2 of selection unit 16e. The switching of switches Q8a and Q8b at the point where switches connected together provides two discrete states of voltage level (V8 and V7) to inductor L2 of selection unit 16e. Capacitors C7, C6 and C5 do not have two series connected switches across them.

The point at which the drain of switch Q34 connects to the connection between capacitor C4 and C5 is also connected to the drain of switch Q340a of MIMO converter 12e. The point may provide (depending of the switching of the switches in MIMO converter 12e and selection unit 16e) discrete voltages V4-V7. Switches Q340a, Q340c and Q340d may be included in multiplexor 88a. The source of switch Q34 connects to the drain of switch Q33 that further connects to the drain of switch Q330a that is included in selection unit 16e. The point at which the source of switch Q33 connects to the connection between capacitor C3 and C4 is also connected to the source of switch Q340b of MIMO converter 12e. The point may provide (depending of the switching of the switches in MIMO converter 12e and selection unit 16e) discrete voltages V3-V4. The drain of switch Q33 connects to the drain of switch Q330a of MIMO converter 12e. The point at which the drain of switch Q32 connects to the connection between capacitor C2 and C3 is also connected to the drain of switch Q320a of MIMO converter 12e. The point may provide, depending of the switching of the switches in MIMO converter 12e and selection unit 16e, discrete voltages V2-V3. The source of switch Q32 connects to the drain of switch Q31. The source of switch Q31 connects to the source of switch of 320b of MIMO converter 12e to provide discrete voltages V1-V2. Provision of discrete voltages V1-V2 may be dependent on the switching of the switches in MIMO converter 12e and selection unit 16e. The drain of switch Q31 also connects to the source of switch Q310a.

In selection unit 16e, the other end of inductor L2 connects to the drains of switch SW1a and switch SW2a. Both switches SW1a and SW2a include multiple switches connected between respective sources and drains. In descriptions that follow, multiple switches wired in series such as switches Q340c, Q330a, and Q310a for example may be implemented with a single switch. The source of switch SW1a provides the live (L) output terminal of converter 107e and is further connected to the drain of switch SW1b/Q320d. The source of switch SW2a provides the neutral (N) output terminal of converter 107e and is further connected to the drain of switch SW2b/Q310b. Switch SW1b may include switches Q320b, Q320c and Q320d. The source of switch Q320b connects to the source of switch Q31 of MIMO converter 12e. The drain of switch Q320b connects to the source of switch Q320c and the source of switch Q320a. The drain of switch Q320a connects to the drain of switch Q32 of MIMO converter 12e. The drain of switch Q320c connects to the source of switch Q320d and to the source of switch Q340c. The drain of switch Q340c connects to the drain of switch Q340b and the source of switch Q340a. The drain of switch Q340a connects to the drain of switch Q34 of MIMO converter 12e. The source of switch Q340b connects to the source of switch Q33 of MIMO converter 12e. Switch SW2b may include switches Q310a where the drain of switch Q310a wired in series with the source switch Q310b. The point at which the drain of switch Q310a connects with the source switch Q310b also connects to the source of switch Q330a. The drain of switch Q330a connects to the drain of switch Q32 of MIMO converter 12e. The drain of switch Q310b may provide the neutral (N) output terminal of converter 107e/ selection unit 16e.

Operation of SIMLO Converter 10e

Reference is now made again to method 201, at step 202 voltage $V_{DC}$ applied at the input of SIMLO converter 10e. Voltage $V_{DC}$ may be converted to provide multiple direct current (DC) voltage outputs on terminals V1-V8. In other words, SIMLO converter 10 may be a circuit for separating a direct current (DC) input power ($V_{DC}$ for example) to provide multiple direct current (DC) voltage outputs on its output terminals V1-V8.

As part of what may be included in step 210, controller 180 as an example of a central controller may sense electrical parameters in power system 100 and/or converter/107e at step 208. Step 210 may operate switches Q1 and Q2 connected to inductor L1 and capacitor C1 and/or the auto transformer circuit included series string ST1. The auto transformer circuit may for example include an inductor pair of inductors such as L15 and L16 and four switches Q15a, Q15b, Q16a and Q16b. The auto transformer circuit may therefore, provide a buck, boost, buck/boost and/or buck+ boost operation on voltage $V_{DC}$. Alternatively, converter 1000 may be utilized instead or in addition to the auto transformer circuits to provide a buck, boost, buck/boost and/or buck+boost operation on voltage $V_{DC}$. The electrical parameters sensed by sensors/sensor interface 184 for example may be voltage, current, impedance, resistance and/or power (P). The power P may be a calculation of sensed voltage (V) multiplied (x) by sensed current (I) performed by controller 180. Control line output 14a may be used to send control signals to SIMLO converter 10e for appropriate control of SIMLO converter 10e to provide a buck function on voltage $V_{DC}$. The buck function on voltage $V_{DC}$ may be to step down the voltage level of voltage $V_{DC}$ if too high whilst stepping up the input current from voltage $V_{DC}$ responsive to the sensed electrical parameters. Whereas in contrast, a boost function on voltage $V_{DC}$ may step up the voltage level if $V_{DC}$ is too low whilst stepping down the input current from voltage $V_{DC}$ responsive to the sensed electrical parameters.

Control signals provided on control line output 14a may also include control signals with respect to the operation of the auto transformer circuit. The auto transformer circuit may include inductors L3-L13 to provide multiple direct current (DC) voltage outputs on the output terminals V1-V7 of SIMO converter 10e. Operation of the auto transformer circuit by use of multiple tapped inductors of the auto transformer circuit that may include switches Q3b-Q13a. The taps may be adapted for connecting individually to the DC voltage input to (terminals V1-V8). Each tapped inductor therefore may form a switched auto transformer circuit with both electrical and/or electro-magnetic connections (in the case of inductors L15 and L16). The electrical and/or electro-magnetic connections may be operated so that multiple direct current (DC) voltage outputs derived from converting the input voltage ($V_{DC}$) by SIMLO converter 10e are provided on terminals V1-V8. The inductor pair of L15 and L16 may have the same number of winding turns. There may also be a different number of turns to the inductor pair of L15 and L16. The different number of turns may provide a way to adjust the typical relative maximum power point (MPP) voltage of each of the voltages on terminals V1-V8.

Control signals on control line output 14a may be by a first modulation scheme responsive to the electrical parameters sensed at step 208. The first modulation scheme may include pulse width modulation (PWM), frequency modulation (FM) or a variable frequency and variable pulse width. Control signals on control line output 14a may include consideration of reference waveform 19 and the effect of a load connected to the output of selector unit 16e. The control signals may be responsive to sensing step 208 so that the DC voltage outputs on terminals V1-V8 may be set and maintained at the required DC levels. PWM from PWM unit 14 may be applied to the gate connections of the switches of SIMLO converter 10e via control line output 14a.

Operation of MIMO Converter 12e and Selection Unit 16e

At step 204, MIMO converter 12e may convert some of the discrete voltage levels (V1-V8) on its input to two discrete states of alternating current (AC) voltage levels on the five outputs of MIMO converter 12e (OP1a-OP5a). Unlike MIMO converter 12d, the five outputs (OP1a-OP5a) of MIMO converter 12e may have DC sources that have different potential difference values or unequal voltage amplitude values. For example, the potential difference of two discrete voltage levels between output OP4a (V4-V3) may be greater than the potential difference the two discrete voltage levels of output OP5a (V7-V8). When MIMO converter 12e is used in conjunction with selection unit 16e in steps 204 and 206 to choose unequal dc sources, some switching-state redundancies may be avoided. Consequently, different output-voltage levels may be generated with substantially the same number of switches and/or less switches.

When MIMO converter 12e is used in conjunction with selection unit 16e in order to realize steps 204 and 206, switches Q8a and Q8b connect in series across capacitor $C_8$ at nodes X and Y. Nodes X and Y present an input to a two-level inverter topology to the DC potential difference between terminals V8 and V7 applied to the input. The alternating current (AC) output of the two-level inverter topology (V8-V7) may be derived from the mid-point connection between switches Q8a and Q8b. The mid-point connection connects to inductor L2 of selection unit 16e. Similar two-level inverter topologies may exist between the other switches of MIMO converter 12e, for example between switches Q34 and Q33, Q33 and Q32, Q32 and Q31. The switches of selection unit 16e may be used to enable outputs of the two-level inverter topologies selectable by the switches of selection unit 16e. For example, the live (L) connection point of converter 107e may be provided from the mid-point connection between switches Q8a and Q8b. The mid-point connection connects to inductor L2 of selection unit 16e, through inductor L2 and switch SW1a to the live (L) connection point of converter 107e as discrete voltage levels V7 and V8. The operation of the other switches in selection unit 16e may also provide the live (L) connection point of converter 107e. The live (L) connection point may be provided from discrete voltage levels V1-V2, V2-V3, V3-V4 and/or V4-V7.

The neutral (N) point of converter 107e may connect to voltage terminal V1 via switches SW2a and SW2b of selection unit 16e and body diode of switch Q31. The neutral (N) point of converter 107e may connect to and/or voltage terminal V2 via switch SW2a and SW2b of selection unit and switch Q32. Further, the neutral (N) point of converter 107e may connect to voltage terminal V3 via the body diodes of switches Q310b and Q330a then through and Q33 and/or voltage terminal V4 via the body diodes of switches Q310b and Q330a and through switch Q34. The PWM on control line output 14b may be provided by controller 180 (as part of control step 210) responsive to sensed electrical parameters of converter 107e at step 208. The sensed electrical parameters of converter 107e may include the discrete voltage levels (V1-V8). The effect of a load connected to the output of selector unit 16e and may further include consideration of reference waveform 19. In a similar way the live (L) point of converters 107b/107c may connect to voltage terminal V1 via switches SW1a (not shown) and SW1b and/or from voltage terminal V2 via switch Q320a, switch Q320c and switch Q320d. Further, the live (L) point of converter 107b/107c may connect to voltage terminal V3 via switches Q340b, Q340c and Q320d and/or voltage terminal V4 via switches Q340a, Q340c and Q320d.

Figure 3B:
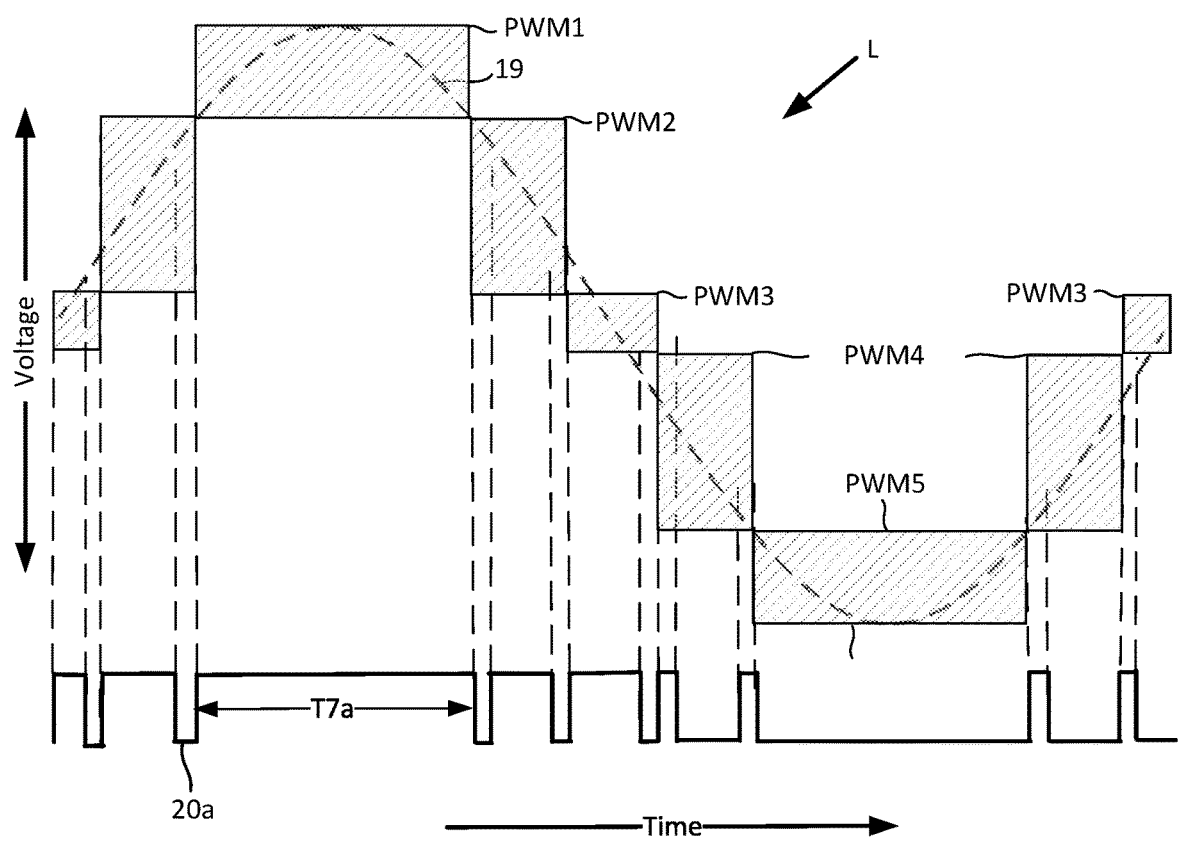
FIG. 3B shows a possible waveform of the live (L) voltage output of the selection unit of FIG. 3A with respect to neutral (N), according to illustrative aspects of the disclosure.

Reference is now made to FIG. 3B, which shows a possible waveform of the live (L) voltage output of selection unit 16e with respect to neutral (N), according to illustrative aspects of the disclosure. Waveforms may be shown with horizontal axis of time (no units specified) versus voltage on the vertical axis (no numerical values specified). Reference waveform 19 is shown as a sinewave by dotted line. Reference waveform 19 may be a sinewave, triangular wave, square wave or any periodic waveform. Reference waveform 19 may be considered to be representative of the desired output of converter 107e/selection unit 16e. Control signals on control lines 18a and/or 18b may be provided respectively to PWM unit 14 and selector unit 16e. Control signals on control lines 14a and 14b may be provided respectively to SIMLO converter 10e and MIMO converter 12e responsive to parameters of reference waveform 19 and/or sensed parameters of converter 107e.

The parameters of reference waveform 19 may include the desired voltage amplitude and frequency of the output from converter 107e. For example, where load 109 may be a utility grid or single-phase AC motor, the desired voltage and frequency may be 220 Volts (V) and 50 Hertz (Hz) respectively. Electrical parameters sensed by sensors/sensor interface 184 and appropriate signals on control lines 18a, 18b, 14a and 14b may provide appropriate control of converter 107e realized by SIMLO converter 10e, MIMO converter 12e and selection unit 16e. Signals on control lines 18a, 18b, 14a and 14b may ensure correct levels of operating voltage, current, impedance, resistance, phase angle, power factor, level of harmonic distortion, frequency and/or power.

By way of example, in general the two discrete states of AC voltage provided on outputs OP1a-OP5a may be driven with PWM used to drive both converters 10e and/or 12e. the PWM may be much higher in frequency than PWM control signal 20a applied to selection unit 16e for example. The five outputs (OP1a-OP5a) may have different potential difference values or unequal voltage amplitude values of MIMO converter 12. The output L of converter 107e/selection unit 16e may include PWM1 in the positive half cycle and PWM5 in the negative half cycle that may correspond with the selection of output OP5a by selection unit 16e. Similarly, PWM2, PWM3 and PWM4 that may correspond with outputs OP2a, OP3a and OP4a. For example, PWM2 may correspond with output OP4a such that the potential difference of two discrete voltage levels between output OP4a (V4-V3) may be greater than the potential difference the two discrete voltage levels of output OP5a (V7-V8) as shown. However, the time periods by comparison with FIG. 2B, time T7a of PWM control signal 20a may be greater than time period T7 of PWM control signal 20. In time period T7a approximately fifty percent of the conversion energy provided by MIMO converter 12e may reduce the effect of switching-state redundancy when compared to that of MIMO converter 12d for example. The fifty percent of the conversion energy may be by use of the inductor pair of L15 and L16 and four switches Q15a, Q15b, Q16a and Q16b to provide a buck, boost, buck/boost and/or buck+boost operation on voltage $V_{DC}$. The buck, boost, buck/boost and/or buck+boost operation may be in in conjunction with switches Q8a and Q8b of MIMO converter 12e. Alternatively, converter 1000 may be utilized instead or in addition to the auto transformer circuits to provide a buck, boost, buck/boost and/or buck+boost operation on voltage $V_{DC}$. SIMLO converter 10e, MIMO converter 12e and selector unit 16e may therefore be able to produce different output-voltage levels (V1-V8) with substantially the same amount or less switches as MIMO converter 12d and selector unit 16d described above. The different output-voltage levels (V1-V8) with substantially the same amount or less switches may reduce the size and cost of converter 107e. The reliability of converter 107e may also be improved since less semiconductors and capacitors may be employed.

Figure 4A:
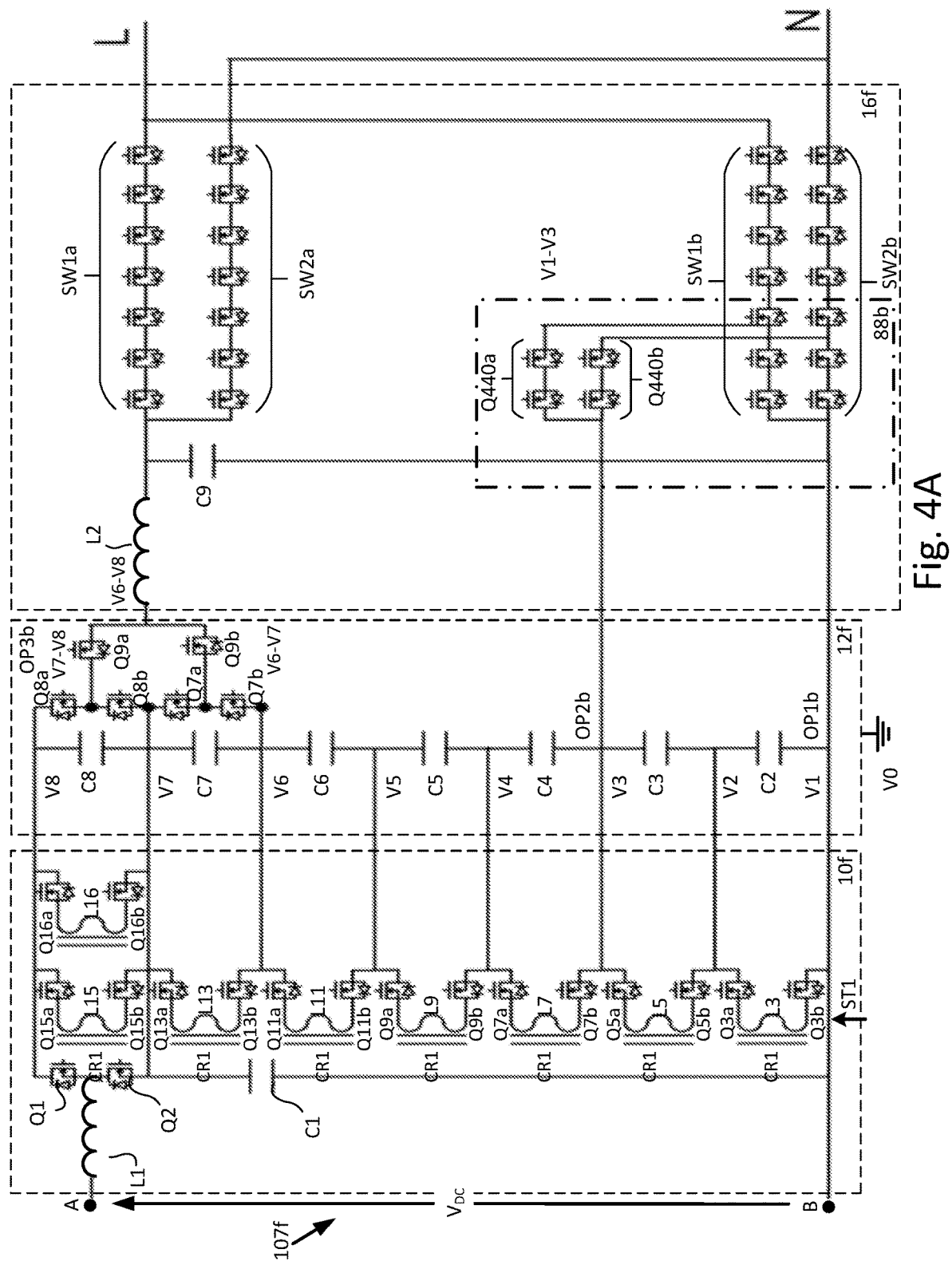
FIG. 4A shows a diagram of details of a converter that includes a SIMLO converter, a MIMO converter and a selector unit, according to illustrative aspects of the disclosure.

Reference now made to FIG. 4A, which shows a diagram of further details converter 107f that includes SIMLO converter 10f, MIMO converter 12f and selector unit 16f, according to illustrative aspects of the disclosure. Converter 107f is similar to converter 107e in that SIMLO converter 10e is the same as SIMLO converter 10f. Common to the other MIMO converters described above, MIMO converter 12f includes capacitor $C_2$ that connects across terminals V1 and V2 and capacitors $C_3$-$C_8$ that connect across respective terminals. Capacitor $C_3$ connects across terminals V2 and V3, $C_4$ connects across terminals V3 and V4 and so on. Two switches Q8a and Q8b connect in series across capacitor $C_8$ that is the same as switching network Sn described above. A further two switches Q7a and Q7b connect in series across capacitor $C_7$ to provide a second switch network Sn. A further two switches Q9a and Q9b may be wired in series and wired across the two outputs of the two switching networks Sn. The point where switches Q9a and Q9b are connected together gives an output of MIMO converter 12f that connects to one end of inductor L2 that may be included in selector unit 16f.

The other end of inductor L2 connects to one end of capacitor $C_9$ and to one side of switches SW1a and SW2a that are connected together. The other side of capacitor $C_9$ connects to both the neutral (N) and live (L) via respective switches SW2b and SW1b. The other sides of switches SW1a and SW2a provide respectively the live (L) and neutral (N) outputs of converter 107f. The live (L) and neutral (N) outputs of converter 107f connect respectively to switches SW1b and SW2b that may be included in MUX 88b. The other side of switches SW1b and SW2b connect together and provide the multiple live (L) and neutral (N) inputs to MUX 88b. Control of switches in MUX 88b allow connection of neutral (N) to either terminal V1 or V3 respectively via switch SW2b or a portion of switch SW2b and switch Q440b. Similarly, live (L) may be connected to terminal V1 or V3 respectively via switch SW1b or a portion of switch SW1b and switch Q440a. Alternatively switches Q440a and Q440b may be located in MIMO converter 12f so that the PWM supplied to SIMLO converter 10f and/or MIMO converter 12f may be at a higher frequency compared to the frequency of PWM that may be supplied to selector unit 16f.

Figure 4B:
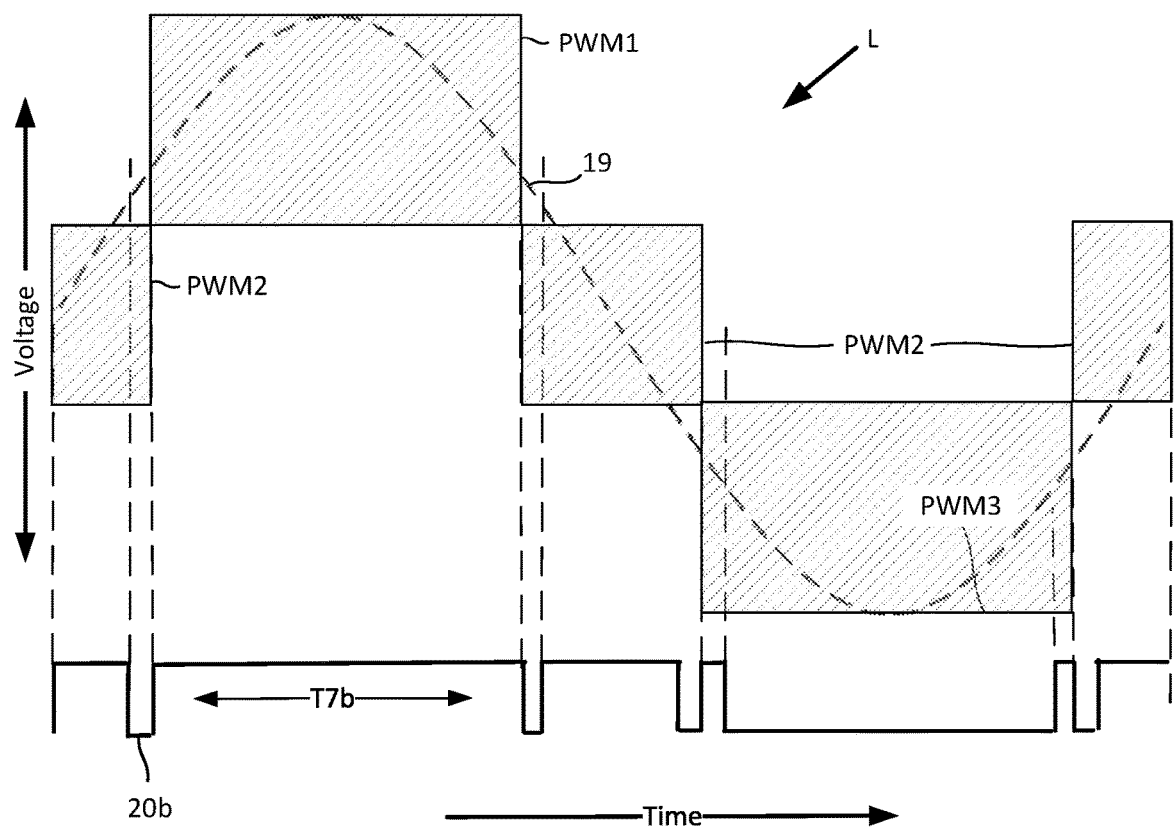
FIG. 4B shows a possible waveform of the live voltage output of a selection unit of FIG. 4A with respect to neutral (N), according to illustrative aspects of the disclosure.

Reference is now made to FIG. 4B, which shows a possible waveform of the live (L) voltage output of selection unit 16f with respect to neutral (N), according to illustrative aspects of the disclosure. Waveforms may be shown with horizontal axis of time (no units specified) versus voltage on the vertical axis (no numerical values specified). Reference waveform 19 is shown as a sinewave by dotted line. Reference waveform 19 may be a sinewave, triangular wave, square wave or any periodic waveform. Reference waveform 19 may be considered to be representative of the desired output of converter 107f/selection unit 16f. Control signals on control lines 18a and/or 18b may be provided respectively to PWM unit 14 and selector unit 16f. Control signals on control lines 14a and 14b may be provided respectively to SIMLO converter 10f and MIMO converter 12f responsive to parameters of reference waveform 19 and/or sensed parameters of converter 107f.

The parameters of reference waveform 19 may include the desired voltage amplitude and frequency of the output from converter 107f. For example, where load 109 may be a utility grid or single-phase AC motor, the desired voltage and frequency may be 220 Volts (V) and 50 Hertz (Hz) respectively. Electrical parameters sensed by sensors/sensor interface 184 and appropriate signals on control lines 18a, 18b, 14a and 14b may provide appropriate control of converter 107e. Signals on control lines 18a, 18b, 14a and 14b may ensure correct levels of operating voltage, current, impedance, resistance, phase angle, power factor, level of harmonic distortion, frequency and/or power for example.

By way of example, in general the two discrete states of AC voltage provided on outputs OP1b-OP3b may be driven with PWM used to drive both converters 10f and/or 12f. The PWM may be much higher in frequency than PWM control signal 20b applied to selection unit 16f for example. Three outputs (OP1b-OP3b) may have different potential difference values or unequal voltage amplitude values of MIMO converter 12f. The output L of converter 107f selection unit 16f may include PWM1 in the positive half cycle and PWM3 in the negative half cycle that may correspond with the selection of output OP3b by selection unit 16f. Similarly, PWM1 and PWM2 may correspond with outputs OP1b and OP2b. PWM2 may correspond with output OP4a such that the potential difference of two discrete voltage levels between output OP2b (V3-V1) may be greater than the potential difference the two discrete voltage levels of output OP3b (V8-V6) as shown. However, the time periods by comparison with FIG. 3B, time T7b of PWM control signal 20b may be greater than time period T7a of PWM control signal 20a. Time period T7b may be approximately more than fifty percent of the conversion energy provided by MIMO converter 12f. The more than fifty percent of the conversion energy may reduce the effect of switching-state redundancy when compared to that of MIMO converter 12e, for example.

The more than fifty percent of the conversion energy may be by use of the inductor pair of L15 and L16 and four switches Q15a, Q15b, Q16a and Q16b to provide a buck, boost, buck/boost and/or buck+boost operation on voltage $V_{DC}$. The more than fifty percent of the conversion energy may be in conjunction with switches Q8a, Q8b, Q9a and Q9b of MIMO converter 12f. Alternatively, converter 1000 may be utilized instead or in addition to the auto transformer circuits to provide a buck, boost, buck/boost and/or buck+boost operation on voltage $V_{DC}$. SIMLO converter 10f, MIMO converter 12f and selector unit 16f may therefore be able to produce different output-voltage levels (V1-V8) with substantially the same amount or less switches as MIMO converter 12e and selector unit 16e described above. The different output-voltage levels (V1-V8) with substantially the same amount or less switches may reduce the size and cost of converter 107f. The reliability of converter 107f may also be improved since less semiconductors and capacitors may be employed. In sum, converters 107e and 107f may be considered as having asymmetric converter topologies. In general, a de-population of the number of switches used in MIMO converter 12 and selection unit 16 by use of multiplexor 88 may provide a way to reduce the size and cost of converter 107. Whereas converter 107d may have more switches compared to converters 107e and 107f. Converter 107d may offer an improved reduction in total harmonic distortion (THD) by providing for the function of harmonic cancellation due to the symmetrical topology of converter 107d.

Now referring to Table 2 below, Table 2 shows a comparison of the number of switches in each of MIMO converters 12d, 12e, 12f, selection units 16d, 16e, 16f shown in respective FIGS. 1J, 3A and 4A. Using selection unit 16e as an example and applying the analysis to the other selection units 16d and 16f, multiple switches wired in series such as switches Q340c, Q330a, and Q310a for example may be implemented using a single switch.

TABLE 2

|  | 12d | 16d | 12e | 16e | 12f | 16f |
|---|---|---|---|---|---|---|
| No. switches | 14 | 12 | 6 | 12 | 6 | 6 |

From Table 2 it can be seen that the number of switches used is reduced when comparing converter 107d with converter 107e and converter 107e when compared to converter 107f. However, the number of levels of current/voltage outputs also decreases when comparing converter 107d with converter 107e and converter 107e when compared to converter 107f. Performance of when comparing converter 107d with converter 107e and converter 107e when compared to converter 107f with respect to root mean square (RMS) of the filtered outputs of each selection unit 16 is summarized in Table 3 below in greater detail in descriptions that follow.

In general, the root mean square (RMS) of a function g{x} may be given by the following formula:

$$G(x)_{RMS} = \sqrt{\left[\frac{1}{T}\int_0^T (g\{x\} \times g\{x\})dx\right]}$$

Solving the above definite integral, where g(x) is an AC sine wave of frequency f=50 Hz, peak current Im=50 A, ω=2πf, the RMS output current (Irms) of selection units 16 may be calculated by the following formula derived from solving the above integral:

$$I_{rms}^2 = \frac{Im^2}{4\pi}\left[\omega t2 - \frac{\sin 2\omega t2}{2}\right] - \frac{Im^2}{4\pi}\left[\omega t1 - \frac{\sin 2\omega t1}{2}\right]$$

$$Irms = \sqrt{I_{rms}^2}$$

Now referring to Table 3 below, Table 3 shows a summary of RMS current (Irms) values for the output currents of each of converters 107d, 107e and 107f shown in respective figures FIGS. 1J, 3A and 4A. The outputs currents of converters 107d, 107e and 107f are considered sinusoidal by virtue of filtering provided by inductors L2 in each of converters 107d, 107e and 107f. For each of the converters 107d, 107e and 107f, the above equations with respect to RMS current (Irms) are calculated for a half cycle of AC output current. Times t1 and t2 for each output shown in each column of Table 3 correspond to the selection times of respective selection units 16d, 16e and 16f. The selection times determined by respective PWM control signals 20, 20a and 20b. The selection times in general have a lower frequency of PWM control signals compared to PWM control signals applied to respective MIMO converters 12d, 12e and 12f. Output waveforms for each of converters 107d, 107e and 107f may be represented by graphs shown in respective FIGS. 2B, 3B and 4B.

TABLE 3

| FIG. 1J, 2B 107d | | | | | | | |
|---|---|---|---|---|---|---|---|
| O/P4 | | O/P5 | | O/P6 | | O/P7 (T7 = 2.58 ms) | |
| t1 | t2 | t1 | t2 | t1 | t2 | t1 | t2 |
| 0 ms | 0.52 ms | 0.52 ms | 1.81 ms | 1.81 ms | 2.97 ms | 2.97 ms | 5.55 ms |
| Irms | 5.67A | | 8.948A | | 9.6695A | | 15.756A |

| FIG. 3A, 3B 107e | | | | | | |
|---|---|---|---|---|---|---|
| OP3a | | OP4a | | OP5a (T7a = 4.77 ms) | | |
| t1 | t2 | t1 | t2 | t1 | t2 | |
| 0 ms | 0.9 ms | 0.9 ms | 2.58 ms | 2.58 ms | 7.35 ms | |

TABLE 3-continued

| Irms | 7.462A | 10.312A | 18.853A |
|---|---|---|---|

| FIG. 4A 107f | | | |
|---|---|---|---|
| OP2b | | OP3b (T7b = 6.58 ms) | |
| t1 | t2 | t1 | t2 |
| 0 | 1.81 ms | 1.81 ms | 8.39 ms |
| Irms | 10.583A | | 20.709A |

Assuming the same switching frequency and capacitor values from Table 3, it can be seen that time T7 (2.58 ms) of MIMO converter 12d may be less than time T7a (4.77 ms) of MIMO converter 12e and time T7b (6.68 ms) may be greater than time period T7a of MIMO converter 12f. However, the differences between each RMS current (Irms) for respective time periods T7 (15.756A), T7a (18.853A) and T7b (20.709A) are not so different compared to the time differences. Therefore, a benefit of using converter 107f compared to converters 107e and 107d may be use of fewer switches with similar power loss in MIMO converter 12f compared to MIMO converters 12d and 12e. Whereas a benefit of MIMO converter 12d compared to the asymmetric topology of MIMO converters 12e and 12f, may offer an improved reduction in total harmonic distortion (THD). The improved reduction in THD may be provided by the symmetrical topology of converter 107d that may include more switches to provide symmetrical topology. The switches of converter 107d, because of the lower values of rms current (Irms) compared to converters 107e and 107d, may be realized using cheaper MOSFETs within a single converter design. The cheaper MOSFETs may be cheaper because of higher drain to source (rds) resistance compared to MOSFETs of converters 107e and 107d. Compared to converter 107d, the lower values of rms current (Irms) for converters 107e and 107d with the higher drain to source (rds) resistance may give a substantially similar power loss to more expensive lower rds resistance of MOSFETs for converter 107d.

More specifically, with respect to the switches in MIMO converters 12d, 12e and 12f, the current in the switches may follow the substantially rectangular PWM applied to the switches of MIMO converters 12d, 12e and 12f. Since the current may follow the substantially rectangular PWM, the RMS of a PWM current waveform ($I_{RMS}$) is proportional to the square root of its duty cycle D.

$$Irms = A\sqrt{D}$$
$$D = \frac{T_{ON}}{T}$$

Where A is the peak current value of the PWM current waveform in amperes, $T_{ON}$ is the ON period of the PWM current waveform and $T_{OFF}$ is the OFF period of the PWM current waveform. The overall time period T of the PWM current waveform is the sum of $T_{ON}$ and $T_{OFF}$.

Both energy and power loss in MIMO converters 12d, 12e and 12f may therefore be inversely proportional to the capacitance values of the capacitors C2-C8 in each of the MIMO converters 12d, 12e and 12f, the switching frequency and duty cycle of the switches for each RMS output current ($I_{rms}$) may be summarized in Table 4 below. A fixed duty cycle (D) of 50% is used in calculation for each respective output of the switches of MIMO converters 12d, 12e and 12f.

TABLE 4

| FIG. 1J, 2B 107d | | | | | | | | |
|---|---|---|---|---|---|---|---|---|
| | O/P4 | | O/P5 | | O/P6 | | O/P7 | |
| | t1 | t2 | t1 | t2 | t1 | t2 | t1 | t2 |
| | 0 ms | 0.52 ms | 0.52 ms | 1.81 ms | 1.81 ms | 2.97 ms | 2.97 ms | 5.55 ms |
| | 0A | 7.1A | 7.1A | 21.3A | 21.3A | 35.51A | 35.51A | 49.71A |
| Irms/ switch | 6.35A | | 6.35A | | 6.35A | | 6.35A | |

| FIG. 3A, 3B 107e | | | | | | |
|---|---|---|---|---|---|---|
| | OP3a | | OP4a | | OP5a (T7a = 4.77 ms) | |
| | t1 | t2 | t1 | t2 | t1 | t2 |
| | 0 ms | 0.9 ms | 0.9 ms | 2.58 ms | 2.58 ms | 7.35 ms |
| | 0A | 9.09A | 9.09A | 37.5A | 37.5A | 52.27A |
| Irms/ switch | 4.06A | | 6.35A | | 6.6A | |

| FIG. 4A 107f | |
|---|---|
| OP2b | OP3b (T7b = 6.58 ms) |

TABLE 4-continued

|  | t1 | t2 | t1 | t2 |
|---|---|---|---|---|
|  | 0 | 1.81 ms | 1.81 ms | 8.39 ms |
|  | 0A | 14.77A | 14.77A | 48.8A |
| Irms/Switch | 6.60A | | 5.08A | |

The substantially symmetrical topology of converter 107d is reflected in the substantially equal currents for each switch in MIMO converter 12d of 6.35 amperes (A). Whereas the substantially asymmetrical topologies of converters 107e and 107f is reflected in different $I_R$MS current values per switch since the number of levels of current/voltage outputs also decrease when comparing converter 107d with converter 107e and converter 107e when compared to converter 107f. A benefit of using converter 107f compared to converters 107e and 107d is that it may use fewer switches with similar power loss in MIMO converter 12f compared to MIMO converters 12d and 12e. Whereas a benefit of MIMO converter 12d compared to the asymmetric topology of MIMO converters 12e and 12f, may offer an improved reduction in total harmonic distortion (THD). The improved reduction in THD may be provided by the symmetrical topology of converter 107d that may include more switches to provide symmetrical topology.

Descriptions above have illustrated a single-phase converter but the same use of switches may be applied to similar three phase converter circuit implementations also. The same use of switches may be applied to other converter topologies for both three-phase and single-phase converters. The same use of switches may also be similarly applied to multi-level converters of various types.

All optional and preferred features and modifications of the described aspects and dependent claims are usable in all aspects taught herein. Furthermore, the individual features of the dependent claims, as well as all optional and preferred features and modifications of the described aspects are combinable and interchangeable with one another. In addition to descriptions for FIG. 1J, FIG. 3A and FIG. 4A that describe the cascaded components for converter 107, it may be possible by way of non-limiting example to have converter 107 as SIMLO converter 10d cascaded with MIMO converter 12e and selector unit 16f and/or SIMLO converter 10e, cascaded with MIMO converter 12f and selector unit 16e and so on. A person skilled in the art would make the appropriate selection of components of converter 107 and selection of the appropriate control signals (e.g. control outputs 14a, 14b, 18a and 18b). The appropriate selection of components and selection of appropriate control signals responsive to a desired reference waveform 19 and sensed electrical parameters of converter 107. The sensed electrical parameters may include voltage, current, impedance, resistance, phase angle, power factor, level of harmonic distortion, frequency and/or power.

What is claimed is:

1. A system comprising:
   a sensor configured to sense an electrical parameter comprising at least one of: voltage, current, impedance, resistance, phase angle, power factor, harmonic distortion, frequency, or power;
   a first converter comprising a first switching circuit and three or more first output terminals, wherein the first switching circuit is configured to:
   convert a direct current (DC) input voltage into three or more discrete voltage levels; and
   provide each of the three or more discrete voltage levels at a corresponding one of the three or more first output terminals;
   a second converter comprising a second switching circuit configured to convert the three or more discrete voltage levels into a plurality of modulated voltages, wherein each modulated voltage, of the plurality of modulated voltages, comprises two discrete voltage levels selected from the three or more discrete voltage levels, and wherein a quantity of the plurality of modulated voltages is less than a quantity of the three or more discrete voltage levels;
   a controller configured to, based on the electrical parameter, control the second converter to convert the three or more discrete voltage levels into the plurality of modulated voltages using at least one of:
   pulse width modulation,
   frequency modulation, or
   both variable frequency and variable pulse width modulation; and
   a selection circuit configured to, based on the electrical parameter, alternatively output each modulated voltage of the plurality of modulated voltages across a pair of output terminals.

2. The system of claim 1, wherein the selection circuit comprises:
   a rotary switch comprising terminals, a pole, and a shaft, wherein the terminals of the rotary switch are connectable to one or more output terminals of the second converter, and
   wherein the pole is configured to provide each modulated voltage of the plurality of modulated voltages based on a velocity of rotation of the shaft.

3. The system of claim 1, wherein the selection circuit comprises:
   a plurality of interconnected switches configured to output at least one of the plurality of modulated voltages that are output by the second converter.

4. The system of claim 1, further comprising:
   a filter connected to the pair of output terminals of the selection circuit and configured to filter each modulated voltage, of the plurality of modulated voltages, that is output by the selection circuit.

5. The system of claim 1, wherein the first switching circuit comprises at least one of: a buck circuit, a boost circuit, a buck/boost circuit, or a buck plus (+) boost circuit.

6. The system of claim 1, wherein the second switching circuit comprises one of:
   a two-level inverter configured to output at least one modulated voltage of the plurality of modulated voltages, or
   a multi-level inverter configured to output at least one modulated voltage of the plurality of modulated voltages.

7. The system of claim 1, wherein the second converter further comprises:
a series connection of capacitors, and
one or more switches of the second switching circuit, wherein the one or more switches are connected across at least one capacitor of the series connection of capacitors.

8. The system of claim 1, wherein the second converter is configured to provide each of the plurality of modulated voltages at a corresponding one of a plurality of second output terminals.

9. A method comprising:
sensing, by a sensor, an electrical parameter comprising at least one of: voltage, current, impedance, resistance, phase angle, power factor, harmonic distortion, frequency, or power;
converting, by a first converter, a direct current (DC) input voltage into three or more discrete voltage levels;
controlling, by a controller and based on the electrical parameter, a second converter to convert the three or more discrete voltage levels into a plurality of modulated voltages, wherein each modulated voltage, of the plurality of modulated voltages, comprises two discrete voltage levels selected from the three or more discrete voltage levels, wherein a quantity of the plurality of modulated voltages is less than a quantity of the three or more discrete voltage levels, and wherein the three or more discrete voltage levels are converted into the plurality of modulated voltages using at least one of:
pulse width modulation,
frequency modulation, or
both variable frequency and variable pulse width modulation; and
alternatively outputting, by a selection circuit and based on the electrical parameter, each modulated voltage of the plurality of modulated voltages across a pair of output terminals.

10. The method of claim 9, wherein alternatively outputting each modulated voltage of the plurality of modulated voltages is based on a reference signal comprising at least one of: a sine wave, a triangular wave, a square wave, or a sawtooth wave.

11. The method of claim 9, wherein at least one modulated voltage of the plurality of modulated voltages is generated by the second converter via one of a two-level inverter or a multi-level inverter.

12. The method of claim 9, wherein the first converter comprises at least one of: a buck circuit, a boost circuit, a buck/boost circuit, or a buck plus (+) boost circuit.

13. The method of claim 9, further comprising outputting, by a plurality of interconnected switches, at least one of the plurality of modulated voltages that are output by the second converter.

14. The method of claim 9, further comprising:
filtering, by a filter connected to the pair of output terminals of the selection circuit, each modulated voltage, of the plurality of modulated voltages, that is output by the selection circuit.

15. The method of claim 9, wherein the second converter comprises a series connection of capacitors.

16. The method of claim 9, further comprises the steps of:
providing each of the three or more discrete voltage levels at a corresponding one of a plurality of first output terminals; and
providing each of the plurality of modulated voltages at a corresponding one of a plurality of second output terminals.

* * * * *